US010525324B2

(12) United States Patent
Kudirka et al.

(10) Patent No.: US 10,525,324 B2
(45) Date of Patent: Jan. 7, 2020

(54) MIXED-REALITY KICK TRACKING AND SIMULATION

(71) Applicant: vSports, LLC, Omaha, NE (US)

(72) Inventors: Thomas Kudirka, Omaha, NE (US); Patrick J. Bennett, Omaha, NE (US)

(73) Assignee: vSports, LLC, Omaha, NE (US)

( * ) Notice: Subject to any disclaimer, the term of this patent is extended or adjusted under 35 U.S.C. 154(b) by 0 days.

(21) Appl. No.: 15/991,867

(22) Filed: May 29, 2018

(65) Prior Publication Data

US 2019/0126125 A1    May 2, 2019

Related U.S. Application Data

(63) Continuation-in-part of application No. 15/914,789, filed on Mar. 7, 2018, now Pat. No. 10,204,456.
(Continued)

(51) Int. Cl.
*A63B 71/06* (2006.01)
*A63B 69/00* (2006.01)
(Continued)

(52) U.S. Cl.
CPC ........ *A63B 71/0622* (2013.01); *A63B 69/002* (2013.01); *G02B 27/0093* (2013.01);
(Continued)

(58) Field of Classification Search
CPC .......... A63B 2220/833; A63B 24/0021; A63B 2243/007; A63B 24/0062;
(Continued)

(56) References Cited

U.S. PATENT DOCUMENTS 9,694,269 B2  7/2017  Leech et al.
9,802,102 B2  10/2017 Leech
(Continued)

FOREIGN PATENT DOCUMENTS

EP    3200008 A1    8/2017

OTHER PUBLICATIONS

"Seriously Anything: Future", Youtube video clip accessible as of Mar. 7, 2017 at https://youtu.be/5rW0P3wbS4o, Ally Invest Securities LLC, apparently published on Sep. 11, 2017.
(Continued)

*Primary Examiner* — Xilin Guo
(74) *Attorney, Agent, or Firm* — Suiter Swantz pc llo

(57) ABSTRACT

A mixed-reality kick simulation system includes a ball-tracking sub-system configured to generate ball tracking data when the ball is kicked by a user, a near-eye display configured to display mixed-reality virtual objects displayed over physical objects within a user field of view, and a controller. The near-eye display may include a user input device and one or more sensors to determine the field of view of the user defining view vectors representing lines of sight of the. The controller may direct the near-eye display to display a mixed-reality environment including virtual objects within at least a portion of the user field of view, receive ball tracking data of a ball kicked by the user in real-time from the ball-tracking sub-system, and direct the near-eye display to display a virtual object representing a trajectory of the ball within the mixed-reality environment in real-time based on the ball-tracking data.

20 Claims, 15 Drawing Sheets

Related U.S. Application Data which is a continuation-in-part of application No. 15/914,812, filed on Mar. 7, 2018.

(60) Provisional application No. 62/590,556, filed on Nov. 25, 2017, provisional application No. 62/577,551, filed on Oct. 26, 2017, provisional application No. 62/520,127, filed on Jun. 15, 2017, provisional application No. 62/516,155, filed on Jun. 7, 2017, provisional application No. 62/511,657, filed on May 26, 2017, provisional application No. 62/468,044, filed on Mar. 7, 2017.

(51) Int. Cl.
*G02B 27/00* (2006.01)
*G02B 27/01* (2006.01)
*G06K 9/00* (2006.01)
*G06T 19/00* (2011.01)

(52) U.S. Cl.
CPC ..... *G02B 27/0172* (2013.01); *G06K 9/00342* (2013.01); *G06T 19/006* (2013.01); *A63B 2071/0636* (2013.01); *A63B 2071/0641* (2013.01); *A63B 2071/0666* (2013.01)

(58) Field of Classification Search
CPC .... A63B 2243/0025; A63B 2024/0025; A63B 69/002; A63B 71/0619; A63B 2220/13; A63B 2024/0028; A63B 2243/0066; G06K 9/00342; G06K 9/00671; G06T 2207/30241; G06T 2207/30224; G06T 19/006

See application file for complete search history.

(56) References Cited

U.S. PATENT DOCUMENTS

| | | |
|---|---|---|
| 9,839,828 B2 | 12/2017 | Leech et al. |
| 9,914,037 B2 | 3/2018 | Nordstrom |
| 10,204,456 B2 | 2/2019 | Kudirka et al. |
| 2006/0116185 A1 | 6/2006 | Krull |
| 2006/0287137 A1 | 12/2006 | Chu |
| 2007/0238539 A1 | 10/2007 | Dawe et al. |
| 2007/0298896 A1 | 12/2007 | Nusbaum et al. |
| 2009/0213038 A1 | 8/2009 | Huang et al. |
| 2011/0224027 A1 | 9/2011 | Edmondson |
| 2012/0004956 A1* | 1/2012 | Huston ............... H04W 4/21 705/14.1 |
| 2012/0007885 A1 | 1/2012 | Huston |
| 2012/0236031 A1 | 9/2012 | Haddick et al. |
| 2013/0095924 A1* | 4/2013 | Geisner ............... G06F 3/012 463/32 |
| 2013/0117377 A1 | 5/2013 | Miller |
| 2013/0137076 A1 | 5/2013 | Perez et al. |
| 2013/0172093 A1 | 7/2013 | Leech |
| 2013/0328762 A1 | 12/2013 | McCulloch et al. |
| 2014/0038750 A1 | 2/2014 | Leech |
| 2014/0287806 A1 | 9/2014 | Balachandreswaran |
| 2015/0050629 A1 | 2/2015 | Pease et al. |
| 2015/0343294 A1* | 12/2015 | Leech ............ A63B 69/3608 473/209 |
| 2015/0373474 A1 | 12/2015 | Kraft et al. |
| 2015/0379351 A1* | 12/2015 | Dibenedetto ...... G06K 9/00671 345/633 |
| 2016/0158640 A1 | 6/2016 | Gupta et al. |
| 2016/0377864 A1 | 12/2016 | Moran |
| 2017/0028299 A1* | 2/2017 | The ............... G02B 27/017 |
| 2017/0142329 A1* | 5/2017 | Pelz ............... H04N 5/23219 |
| 2017/0151484 A1 | 6/2017 | Reilly et al. |
| 2017/0203187 A1 | 7/2017 | Ito et al. |
| 2017/0263056 A1 | 9/2017 | Leppanen et al. |
| 2017/0340948 A1 | 11/2017 | Leech |
| 2018/0053284 A1 | 2/2018 | Rodriguez et al. |
| 2018/0065018 A1 | 3/2018 | Leech et al. |
| 2018/0256962 A1 | 9/2018 | Kudirka et al. |
| 2018/0261010 A1 | 9/2018 | Kudirka et al. |

OTHER PUBLICATIONS

International Search Report and Written Opinion dated May 7, 2018 for PCT/US2018/021323.

International Search Report and Written Opinion dated May 14, 2018 for PCT/US2018/021317.

International Search Report and Written Opinion dated Aug. 29, 2018 for PCT/US2018/034949.

International Search Report and Written Opinion dated Sep. 10, 2018 for PCT/US2018/036544.

\* cited by examiner

MIXED-REALITY KICK TRACKING AND SIMULATION

CROSS-REFERENCE TO RELATED APPLICATIONS

The present application is a continuation-in-part of and claims the benefit under 35 U.S.C. § 120 of U.S. application Ser. No. 15/914,789, filed Mar. 7, 2018, entitled Mixed Reality Golf Simulation and Training System, naming Thomas Kudirka and Patrick J. Bennett as inventors, which claims priority to U.S. Provisional Application Ser. No. 62/468,044 filed Mar. 7, 2017 and U.S. Provisional Application Ser. No. 62/577,551 filed Oct. 26, 2017, all of which are incorporated herein by reference in their entirety.

The present application is a continuation-in-part of and claims the benefit under 35 U.S.C. § 120 of U.S. application Ser. No. 15/914,812, filed Mar. 7, 2018, entitled Mixed Reality Sport Simulation and Training System, naming Thomas Kudirka and Patrick J. Bennett as inventors, which claims priority to U.S. Provisional Application Ser. No. 62/511,657 filed May 26, 2017, U.S. Provisional Application No. 62/516,155 filed Jun. 7, 2017, U.S. Provisional Application No. 62/520,127 filed Jun. 15, 2017, and U.S. Provisional Application Ser. No. 62/590,556 filed Nov. 25, 2017, all of which are incorporated herein by reference in their entirety.

The present application claims the benefit under 35 U.S.C. § 119(e) of U.S. Provisional Application Ser. No. 62/511,657, filed May 26, 2017, entitled Augmented Reality Football Kick Simulator, naming Thomas Kudirka and Patrick Bennett as inventors, which is incorporated herein by reference in the entirety.

The present application claims the benefit under 35 U.S.C. § 119(e) of U.S. Provisional Application Ser. No. 62/590,556, filed Nov. 25, 2017, entitled Augmented Reality Football Kick Simulator, naming Thomas Kudirka and Patrick Bennett as inventors, which is incorporated herein by reference in the entirety.

The present application claims the benefit under 35 U.S.C. § 119(e) of U.S. Provisional Application Ser. No. 62/520,127, filed Jun. 15, 2017, entitled Augmented Reality Soccer Simulation and Training System, naming Thomas Kudirka and Patrick Bennett as inventors, which is incorporated herein by reference in the entirety.

The present application claims the benefit under 35 U.S.C. § 119(e) of U.S. Provisional Application Ser. No. 62/577,551, filed Oct. 26, 2017, which is incorporated herein by reference in the entirety.

TECHNICAL FIELD

The present disclosure relates generally to kick simulation and, more particularly, to a mixed-reality kick simulation and training system.

BACKGROUND

Athletic kickers typically train to perform multiple types of kicks that may be useful in a game. For example, American or Australian-rules football kickers may train to perform kicks such as, but not limited to, kickoffs, punts, on-side kicks field goals, drop punts, torpedo punts, check-side punts, or grubbers. By way of another example, soccer kickers may train to perform kicks such as, but not limited to, instep kicks and inner-side instep kicks. Regardless of the sport, each type of kick typically requires a different kicking technique to achieve a desired ball trajectory. Small changes in an athlete's kicking technique may affect factors such as the launch angle, initial velocity, or rotation that may significantly impact the trajectory of the ball and thus whether a kick is deemed successful. Athletes thus often train on a field to view the kick trajectories as feedback and attempt to adjust their techniques.

However, field practice is not always practical and may be insufficient to diagnose kicking issues. For example, field practice may be limited by weather or access to facilities. By way of another example, kickers preparing for upcoming kicks during a game may be limited to sideline practice kicks into nets that do not provide feedback to evaluate whether the practice kicks would be successful on the field. For instance, a partial trajectory of a practice kick into a net may appear accurate, but the corresponding full trajectory may be off such that a kicker may have a false sense of confidence when performing the kick in the game. Further, simply viewing a trajectory of a kicked ball during field practice may provide limited feedback for correcting or modifying kicking technique. For example, merely observing an issue (e.g., kicks commonly hooking) may be insufficient to solve the problem. Therefore, it may be desirable to provide systems and methods to cure the deficiencies identified above.

SUMMARY

A mixed-reality kick simulation system is disclosed in accordance with one or more illustrative embodiments of the present disclosure. In one illustrative embodiment, the system includes a ball-tracking sub-system configured to generate ball tracking data when the ball is kicked by a user. In another illustrative embodiment, the system includes a near-eye display configured to display mixed-reality virtual objects displayed over physical objects within a user field of view. In another illustrative embodiment, the near-eye display includes a user input device. In another illustrative embodiment, the near-eye display includes one or more sensors to determine the field of view of the user, wherein the field of view defines view vectors representing lines of sight of the user. In another illustrative embodiment, the system includes a controller communicatively coupled to the ball-tracking sub-system and the near-eye display. In another illustrative embodiment, the controller directs the near-eye display to display a mixed-reality environment including virtual objects within at least a portion of the user field of view. In another illustrative embodiment, the near-eye display provides an unobstructed real-world view for view vectors below a selected pitch angle and display at least a portion of the mixed-reality environment for view vectors above a selected pitch angle. In another illustrative embodiment, the controller receives ball tracking data of a ball kicked by the user in real-time from the ball-tracking sub-system. In another illustrative embodiment, the controller directs the near-eye display to display a virtual object representing a trajectory of the ball within the mixed-reality environment in real-time, wherein the trajectory of the ball is based on the ball-tracking data.

A mixed-reality kick simulation system is disclosed in accordance with one or more illustrative embodiments of the present disclosure. In one illustrative embodiment, the system includes a ball-tracking sub-system configured to generate ball-tracking data over a selected portion of a trajectory of a ball kicked by a user. In another illustrative embodiment, the system includes a near-eye display configured to display a mixed-reality scene including virtual objects displayed over physical objects within a field of view of the user. In another illustrative embodiment, the system includes a controller communicatively coupled to the ball-tracking sub-system and the near-eye display. In another illustrative embodiment, the controller directs the near-eye display to provide an unobstructed view real-world view of the ball prior to a kick. In another illustrative embodiment, the controller receives ball-tracking data of a ball over the launch window in real-time from the ball-tracking subsystem over the selected portion of the trajectory of the ball kicked by the user. In another illustrative embodiment, the controller directs the near-eye display to display at least a portion of the ball-tracking data as one or more virtual objects in real time after the kick.

A mixed-reality kick simulation system is disclosed in accordance with one or more illustrative embodiments of the present disclosure. In one illustrative embodiment, the system includes a ball-tracking sub-system configured to generate ball-tracking data of a ball over a launch window when the ball is kicked by a user in which a trajectory of the ball is limited by a ball-containment device. In another illustrative embodiment, the system includes a near-eye display configured to display mixed-reality virtual objects displayed over physical objects within a user field of view in which the near-eye display includes a user input device. In another illustrative embodiment, the system includes a controller communicatively coupled to the ball-tracking sub-system and the near-eye display. In another illustrative embodiment, the controller directs the near-eye display to display a mixed-reality environment including virtual objects depicting one or more elements of an athletic field within at least a portion of the user field of view in which a location of the user within the mixed-reality environment is selectable via the user input device. In another illustrative embodiment, the controller receives ball tracking data of a ball over the launch window in real-time from the ball-tracking sub-system as the user kicks the ball. In another illustrative embodiment, the controller directs the near-eye display to display a virtual object representing the ball moving along a predicted trajectory after the launch window within the mixed-reality environment in which the predicted trajectory is determined based on the ball-tracking data over the launch window.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF DRAWINGS

The numerous advantages of the disclosure may be better understood by those skilled in the art by reference to the accompanying figures in which.

DETAILED DESCRIPTION

Figure 1A:
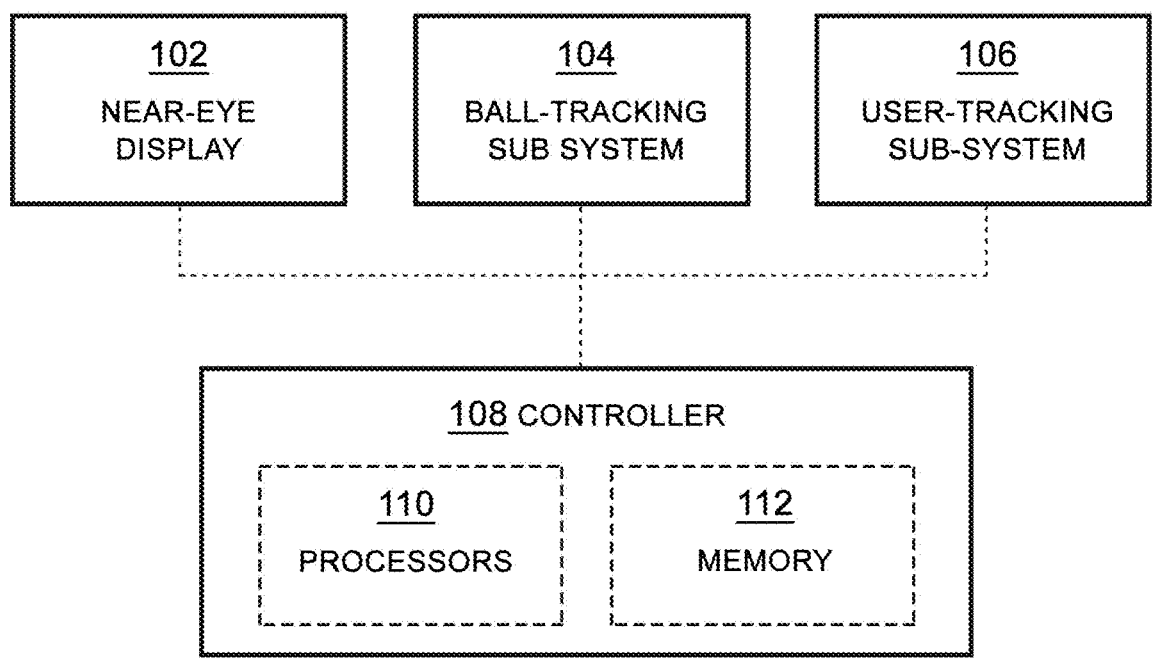
FIG. 1A is a block diagram of components of a mixed-reality kick simulator, in accordance with one or more embodiments of the present disclosure.

Reference will now be made in detail to the subject matter disclosed, which is illustrated in the accompanying drawings. The present disclosure has been particularly shown and described with respect to certain embodiments and specific features thereof. The embodiments set forth herein are taken to be illustrative rather than limiting. It should be readily apparent to those of ordinary skill in the art that various changes and modifications in form and detail may be made without departing from the spirit and scope of the disclosure.

Embodiments of the present disclosure are directed to a mixed-reality kick simulation and training system (e.g., a mixed-reality kick simulator). For example, a mixed-reality kick simulator may include a mixed-reality display device coupled to a ball-tracking system including one or more sensors internal to or external to a ball suitable for tracking the ball during and after a kick. Further, the mixed-reality kick simulator may include a user-tracking system including one or more sensors suitable for monitoring the motion of the user during a kick. The mixed-reality kick simulator may be suitable for use with any style of ball associated with any sport such as, but not limited to American-rules football, Australian-rules football, rugby, or soccer (e.g., association football). In some embodiments, a user may kick a ball and immediately view relevant data about the mechanics of the kick as well as the resulting trajectory. For example, a mixed-reality kick simulator may provide relevant data obtained from the ball-tracking system such as, but not limited to, launch speed, launch angle, travel distance, hang time, rotation, or location of impact. In some embodiments, a user may kick a ball into a net or other containment device and view a virtual football moving along a predicted trajectory within a virtual scene such as a field or a stadium overlaid on the real-world view of the user based on tracking data over a partial trajectory. Accordingly, the user may receive immediate visual and data-driven feedback without requiring the user to be physically present at the field.

Additional embodiments of the present disclosure are directed to a near-eye display with a wearable form-factor. For example, a mixed-reality display device may include mixed-reality glasses providing a partially transmissive surface through which a real-world view of physical objects such as the ball may be viewed as well as an interface for displaying virtual objects to the user. By way of another example, a mixed-reality display device may include a mixed-reality helmet. For instance, components associated with a mixed-reality display device may be integrated within a helmet traditionally worn for a particular sport such as, but not limited to, a football helmet. The mixed-reality kick simulator may thus be portable and may be suitable for use at a location convenient to the user.

The term "mixed-reality" in the present disclosure refers to a visualization technique in which virtual objects are displayed over at least a portion of a field of view of a user. Mixed-reality may encompass a broad range of technologies in which the relative predominance of virtual objects versus physical objects (e.g., objects seen directly with a user's eyes) varies across a spectrum. On one end of the mixed-reality spectrum, commonly referred to as augmented reality (AR), virtual objects are displayed over or are otherwise integrated along with a real-world view of user. In this regard, a field of view may be primarily filled with physical objects seen directly by the user, and virtual objects may be integrated with or interact with the physical objects. On an opposite end of the mixed-reality spectrum, commonly referred to as virtual reality (VR), a field of view is completely obstructed by a virtual scene such that a user is immersed within the virtual scene. Various mixed-reality technologies may further blend virtual and physical objects in a wide range of techniques and user experiences.

Virtual objects may have any degree of transparency to a user. For example, a virtual object may be partially transparent such that physical objects may be partially visible through the virtual object. Accordingly, partially transparent virtual objects may be, but are not required to be, used as guides. By way of another example, a virtual object may be opaque and obstruct a portion of a field of view. In this regard, opaque virtual objects may replace physical objects within a portion of a field of view with virtual objects and may be, but are not required to be, used to provide an immersive scene to a user.

Additional embodiments of the present disclosure are directed to a mixed-reality kick simulator with user-selectable display settings to configure a mixed-reality environment for display before or after a kick. For example, a user in an open field such as a grass field or a parking lot may selectively display virtual objects depicting turf, field markings or goals of a selected sport. For instance, a user may selectively display sidelines, yard lines, hash lines, end zones, or field goal posts of an American football field. In another instance, a user may selectively display sidelines, 50 metre lines, a centre square, or a goal square of an Australian rules football field. In another instance, a user may selectively display touchlines, goal lines, a half-way line, a center circle, or goal nets of a soccer field (e.g., an association football field). In this regard, the virtual objects may be, but are not required to be, characterized as AR objects that coexist with physical objects such as the field within the real-world view of the user. Further, the mixed-reality kick simulator may continuously adjust the sizes and orientations of the virtual objects based on the head orientation and/or lines of sight associated with a field of view of the user to maintain integration with the surrounding physical objects. By way of another example, a user may selectively display an opaque virtual scene representing a field or a stadium. In this regard, the virtual objects may be, but are not required to be, characterized as virtual-reality (VR) objects. Accordingly, the mixed-reality kick simulator may provide an immersive audio/visual experience.

Additional embodiments of the present disclosure are directed to a mixed-reality kick simulator with user-selectable data to be displayed on the mixed-reality display. For example, a ball-tracking system may include cameras and/or sensors to track various aspects of a kicked ball such as, but not limited to, position, velocity, acceleration, direction, launch angle, or rotation for a selected period of time (e.g., a launch window). The mixed-reality kick simulator may then display raw or processed data from the ball-tracking system to the user as virtual objects. The user may then, for example, utilize the data to analyze and make adjustments to kicking technique. In one instance, a user on an athletic field may perform one or more kicks and the mixed-reality kick simulator may provide relevant data associated with the kicks to the user as virtual objects.

Additional embodiments of the present disclosure are directed to tracking the trajectory of a kicked ball over a limited period of time (e.g., a launch window) and displaying a predicted a trajectory of a kicked ball after the launch window. By way of another example, the mixed-reality kick simulator may display a virtual ball travelling across a predicted trajectory determined based on data from the ball-tracking system. In this regard, a user may kick a ball in a constrained environment such as a net or a tether and view simulated motion of the ball in a mixed-reality environment through a complete (predicted) trajectory. Further, the mixed-reality kick simulator may optionally display all or part of the predicted trajectory of the ball by a persistent arc (e.g., a comet tail, or the like).

Additional embodiments of the present disclosure are directed to a mixed-reality kick simulator with a user-tracking system. For example, a user-tracking system may include one or more sensors worn by or external to a user to track aspects of a user's motion prior to and during a kick such as, but not limited to, the foot placement of the user prior to a kick, a number and/or position of steps prior to a kick, leg trajectory, foot speed, foot angle, or point of impact between the foot and the ball. The user-tracking data may thus be integrated with the ball-tracking data from the ball-tracking system to provide additional feedback to the user.

Additional embodiments of the present disclosure are directed to displaying a mixed-reality environment only at selected times or within a selected range of line of sight directions (e.g., view directions, view vectors, gaze directions, gaze vectors, or the like). It is recognized herein that it may be desirable for an athlete to have an unobstructed real-world view at selected times or viewing angles.

For example, the mixed-reality kick simulator may provide an unobstructed real-world view prior to a kick and may display one or more virtual objects after a kick (e.g., after impact with the ball). In this regard, a user may execute a kick with minimal distractions in a natural environment, but may view any selected virtual objects after the kick to provide a mixed-reality simulation experience. In one instance, a user on a training field may execute kicks with an unobstructed real-world view and may view virtual objects such as, but not limited to, a trajectory of the ball and/or selected kick analysis data (e.g., from the ball-tracking system and/or the user-tracking system) in real-time after the kick.

By way of another example, virtual objects displayed by the mixed-reality kick simulator may be bounded to a selected range of view directions. In this regard, a user may view virtual objects (e.g., kick analysis data, a trajectory (real or predicted) virtual elements of a mixed-reality scene, or the like) when looking in selected directions and may view an unobstructed real-world view when looking in other directions. In one instance, the mixed-reality kick simulator may provide a transparent or unobstructed view to the ball when a user's head is facing downwards or towards the ball and may then transition into a mixed-reality scene as the user looks forward. Accordingly, a user may iteratively look up in a direction of a kick to view virtual objects (e.g., virtual goal posts displayed on a physical field, an immersive virtual reality view of a stadium, or the like) and may look down to see an unobstructed view of the ball to line up a shot and prepare for the kick. Similarly, trajectory and/or kick analysis data may be displayed in real-time after a kick.

Additional embodiments of the present disclosure are directed to a mixed-reality kick simulator including guided user coaching using any combination of audio and mixed reality visualizations. For example, a mixed-reality kick simulator may provide coaching suggestions to a user on various kicking techniques, suggest foot positions, or the like. The coaching suggestions may be pre-recorded and/or may be data driven. For instance, the coaching suggestions may be based on data from the ball-tracking system and/or the user-tracking system for a single kick or many kicks. It is recognized herein that while certain fundamental aspects of kicking may be relevant to all or most users, it may be the case that kicking technique may vary between users such that coaching suggestions may be personalized. Accordingly, a mixed-reality kick simulator may generate correlations between aspects of user motion and corresponding trajectories over time based on multiple kicks to develop customized feedback for individual users.

Additional embodiments of the present disclosure are directed to providing mixed-reality feedback to the user. For example, a mixed-reality kick simulator may utilize data from the user-tracking system and/or the ball-tracking system to capture and subsequently replay user and ball motion during a kick. In one instance, the mixed-reality kick simulator may display a 3D avatar of the user performing the kick in mixed reality. Accordingly, a user may save and later view a saved kick in a 3D mixed reality environment such that the user may walk around the avatar and view the saved kick from a variety of angles. It is recognized herein that viewing saved kicks in a 3D mixed reality environment may provide useful feedback to the user. For example, a user may save and review successful kicks to determine what kicking techniques work well. By way of another example, a user may save and review poor kicks to determine what kicking techniques do not work well.

Additional embodiments of the present disclosure are directed to a mixed-reality kick simulator providing multi-person support. Multiple users with mixed-reality kick simulators may thus interact with each other in virtual environments. Further, the multiple users may be located close to each other (e.g., on the same physical field) or may be located remotely. For example, the multiple mixed-reality kick simulators may provide a common virtual environment that is viewed by each user according to its location within the virtual environment. Further, avatars associated with each user may be displayed in the mixed reality environment. In this regard, the multiple users may interact in a multitude of ways. For instance, the users may take turns practicing kicks such that the motion of virtual balls may be visible to all users. In another instance, the users may coach each other based on kicking performance in the virtual environment. In another instance, the users may play a multi-player game in the virtual environment.

Additional embodiments of the present disclosure are directed to a mixed-reality kick simulator having multiple user-selectable operational modes. The operational modes may include pre-defined selections of various display and/or operational settings. For example, an operational mode may include a pre-defined virtual environment such as, but not limited to, a field with goal posts, field markings, goal nets, or the like. By way of another example, an operational mode may include a pre-defined set of kick analysis data to display as virtual objects.

In some embodiments, a mixed-reality kick simulator includes a training mode. A training mode may provide, but is not required to provide, an open-ended experience in which a user may practice one or more types of kicks and view a selected set of kick analysis data. For example, a training mode may display a wide range of trajectory views (comet tails, full persistent arcs, or the like) and/or kick analysis data from any combination of the ball-tracking system and the user-tracking system to the user for immediate feedback. Further, the kick analysis data may include data associated with recent kicks as well as historical data associated with all kicks of a selected type. By way of another example, a training mode may provide optional audio and/or visual coaching feedback to provide suggestions to the user for improvements.

In some embodiments, a mixed-reality kick simulator includes a play mode. A play mode may provide, but is not required to provide, a goal-oriented experience in which a user attempts to complete certain tasks in a selected mixed reality environment. For example, in a play mode, a user may attempt to kick a field goal from a selected position on the field, perform a punt with a target distance or landing location, perform a kickoff kick with a target hangtime, or the like. Accordingly, the mixed-reality kick simulator may display data associated with whether or not the user goal was accomplished. Further, a play mode may provide a selected mixed reality audio/visual experience. For example, a user may select visuals representing a particular stadium (e.g., a stadium of a favorite team or a stadium in which the user will play) and may further select desired audio such as, but not limited to, crowd noise. In this regard, a play mode may provide a user with an immersive kicking experience. By way of another example, a play mode may also provide a game-like experience in which multiple players may compete against each other based on kick analysis data and/or trajectories.

A mixed-reality kick simulator may display virtual objects in various ways with respect to physical objects visible to the user. For example, a virtual object may be head-locked such that the size, shape, or orientation may remain fixed in the field of view of the user regardless of the orientation or gaze direction of the user. In one instance, kick analysis data (launch angle, kick distance, or the like) may be displayed as head-locked virtual objects to facilitate readability. In another instance, logos and/or selection menus may be displayed as head-locked virtual data.

By way of another example, a mixed-reality kick simulator may display a virtual object within a virtual coordinate system designed to replicate the real-world view of the user. In this regard, virtual objects may be scaled, rotated, or transformed such that virtual objects at a selected distance in the virtual coordinate system appear integrated with physical objects in the real-world view at the same distance. Further, the virtual objects may be continually updated to reflect the head orientation and/or gaze direction of the user. In some cases, a user may not perceive a difference between a physical object and a virtual object in a mixed-reality environment. Additionally, virtual objects may be placed within the virtual coordinate system at selected relative distances from each other or may be anchored to physical coordinates (e.g., global positioning system (GPS) coordinates, latitude and longitude coordinates, or the like). For instance, virtual objects representing yard lines of an American football field may be located at fixed distances from each other (e.g., every ten yards) in the virtual coordinate system and displayed to the user based on the location of the user within the virtual coordinate system (e.g., a location on a virtual field). Accordingly, as the user moves in the physical world, virtual objects in the mixed reality environment (e.g., virtual yard lines) may be correspondingly updated. In another instance, a configuration of a virtual field may be anchored to a particular physical location. In this regard, a user may define and associate a customizable virtual environment with a location often visited by the user. Accordingly, the mixed-reality kick simulator may display the elements of the virtual environment any time the user visits the location.

Referring now to FIGS. 1A through 3F, a mixed-reality kick simulator 100 is described in accordance with one or more embodiments of the present disclosure.

FIG. 1A is a block diagram of components of a mixed-reality kick simulator 100, in accordance with one or more embodiments of the present disclosure.

In one embodiment, a mixed-reality kick simulator 100 includes a mixed-reality near-eye display 102 to display virtual objects within the field of view of a user. In another embodiment, a mixed-reality kick simulator 100 includes a ball-tracking sub-system 104 configured to monitor one or more aspects of a kicked ball during and after impact such as, but not limited to, location, velocity, acceleration, launch angle, hook angle, hang time, rotation, distance travelled, or landing location. In another embodiment, the mixed-reality kick simulator 100 includes a user-tracking sub-system 106 configured to monitor one or more aspects of leg motion during a kick such as, but not limited to, foot speed, foot trajectory, an impact location of a foot on the ball, or an angle at which a foot impacts the ball. In another embodiment, the user-tracking sub-system 106 is at least partially integrated with the ball-tracking sub-system 104.

In another embodiment, the mixed-reality kick simulator 100 includes a controller 108. In another embodiment, the controller 108 includes one or more processors 110 configured to execute program instructions maintained on a memory medium 112. In this regard, the one or more processors 110 of controller 108 may execute any of the various process steps described throughout the present disclosure.

The one or more processors 110 of a controller 108 may include any processing element known in the art. In this sense, the one or more processors 110 may include any microprocessor-type device configured to execute algorithms and/or instructions. It is further recognized that the term "processor" may be broadly defined to encompass any device having one or more processing elements, which execute program instructions from a non-transitory memory medium 112. For example, the processors 110 may include one or more microprocessors, microcontrollers, or the like. By way of another example, the processors 110 may include hardwired logic circuitry such as, but not limited to, one or more application-specific integrated circuits (ASICs), programmable logic devices (PLDs), or field programmable gate arrays (FPGAs).

The memory medium 112 may include any storage medium known in the art suitable for storing program instructions executable by the associated one or more processors 110. For example, the memory medium 112 may include a non-transitory memory medium. By way of another example, the memory medium 112 may include, but is not limited to, a read-only memory (ROM), a random-access memory (RAM), a magnetic or optical memory device (e.g., disk), a magnetic tape, a solid-state drive, and the like. It is further noted that memory medium 112 may be housed in a common controller housing with the one or more processors 110. In one embodiment, the memory medium 112 may be located remotely with respect to the physical location of the one or more processors 110 and controller 108. For instance, the one or more processors 110 of controller 108 may access a remote memory (e.g., server), accessible through a network (e.g., internet, intranet, and the like). Therefore, the above description should not be interpreted as a limitation on the present invention but merely an illustration.

The controller 108 may be communicatively coupled to various components of the mixed-reality kick simulator 100 such as, but not limited to, the near-eye display 102, the ball-tracking sub-system 104, or the user-tracking sub-system 106 to carry out steps described throughout the present disclosure. For example, the controller 108 may receive data from the ball-tracking sub-system 104 and/or the user-tracking sub-system 106 associated with a user kicking a ball, process and/or analyze the data, generate a predicted trajectory of the ball, and direct the near-eye display 102 to display virtual objects representing the motion of the ball along the predicted trajectory to the user. By way of another example, the controller 108 may receive image, video, and/or audio data from the near-eye display 102 including physical objects within a field of view of the user, generate a mapping of the physical objects, render virtual objects within a virtual coordinate system to integrate with the physical objects, and direct the near-eye display 102 to display the virtual objects.

The steps described throughout the present disclosure may be carried out by a single controller 108 or, alternatively, multiple controllers. Additionally, the controller 108 may include one or more controllers housed in a common housing or within multiple housings. For example, the controller 108 may be integrated within and/or distributed within any number of components within the mixed-reality kick simulator 100. In this regard, various processing tasks required to perform steps described throughout the present disclosure may be distributed to suitable components based on factors such as, but not limited to, processing power, memory, or physical space requirements of any component in the mixed-reality kick simulator 100.

In one embodiment, the controller 108 may be fully or partially integrated into the near-eye display 102. In another embodiment, the controller 108 is at least partially distributed to additional components of the mixed-reality kick simulator 100 such as the ball-tracking sub-system 104 or the user-tracking sub-system 106. For example, it may be the case that the additional system components may have increased processing and/or memory capabilities such that the performance of the mixed-reality kick simulator 100 may be improved by offloading at least a portion of processing steps described throughout the present disclosure. In another embodiment, the controller 108 is at least partially distributed to a mobile computing device such as, but not limited to, a mobile phone, a tablet computing device, or a laptop communicatively coupled to or integrated within the mixed-reality kick simulator 100.

Figure 1B:
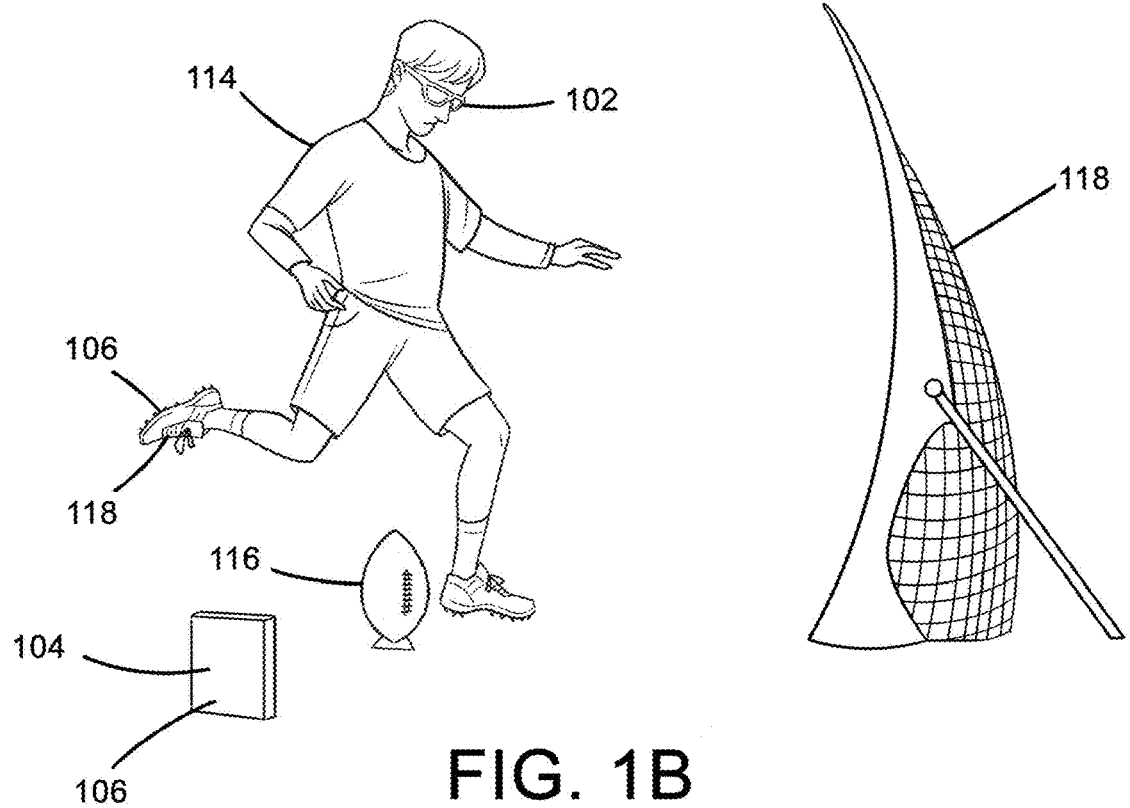
FIG. 1B is a conceptual view of a user kicking a football into a net, in accordance with one or more embodiments of the present disclosure.

Referring now to FIGS. 1B through 3F, the interaction of a user 114 with the mixed-reality kick simulator 100 is illustrated in accordance with one or more embodiments of the present disclosure. In one embodiment, the user 114 kicks a ball 116 in a constrained environment such that the trajectory of the ball 116 it at least partially limited by a containment device 116 (e.g., a net, a tether, or the like). For example, FIG. 1B is a conceptual view of a user 114 kicking a football 116 into a net, in accordance with one or more embodiments of the present disclosure. By way of another example, FIG. 1C is a conceptual view of a user 114 kicking a tethered soccer ball 116, in accordance with one or more embodiments of the present disclosure. It is to be understood, however, that the mixed-reality kick simulator 100 may be used with any type of ball 116 to be kicked such as, but not limited to, an American-rules football (e.g., as shown in FIG. 1B), an Australian-rules football, a rugby ball, or a soccer ball (e.g., as shown in FIG. 1C).

In another embodiment, the ball-tracking sub-system 104 is positioned to track the ball 116 during the kick and throughout a launch window. For example, the ball-tracking sub-system 104 may track one or more aspects of the ball 116 (e.g., location, velocity, acceleration, rotation, or the like) until the motion of the ball 116 is impeded by the containment device 116. In another embodiment, the user-tracking sub-system 106 are positioned to track the motion of the user 114 during the kick. In another embodiment, a user 114 wears the near-eye display 102 while kicking the ball 116. In this regard, the near-eye display 102 may display a mixed reality environment to the user 114 in which one or more virtual objects are displayed within the real-world view of the user 114. For example, the near-eye display 102 may display a virtual ball travelling along a predicted trajectory in the mixed reality scene based on data from the ball-tracking sub-system 104 over the launch window and/or the user-tracking sub-system 106. By way of another example, the near-eye display 102 may display virtual objects such as, but not limited to, kick analysis data, coaching feedback, avatars representing the user and/or additional users, or the like.

It is to be further understood that the mixed-reality kick simulator 100 is not limited to kicking the ball 116 into a containment device 116. In one embodiment, the user 114 may kick the ball 116 in an open area (e.g., an open field) and the mixed-reality kick simulator 100 (e.g. via the ball-tracking sub-system 104) may generate ball-tracking data for a complete trajectory. Further, the near-eye display 102 may display kick analysis data, coaching feedback, avatars representing the user and/or additional users, or the like based on the ball-tracking data over the complete trajectory.

Figure 2A:
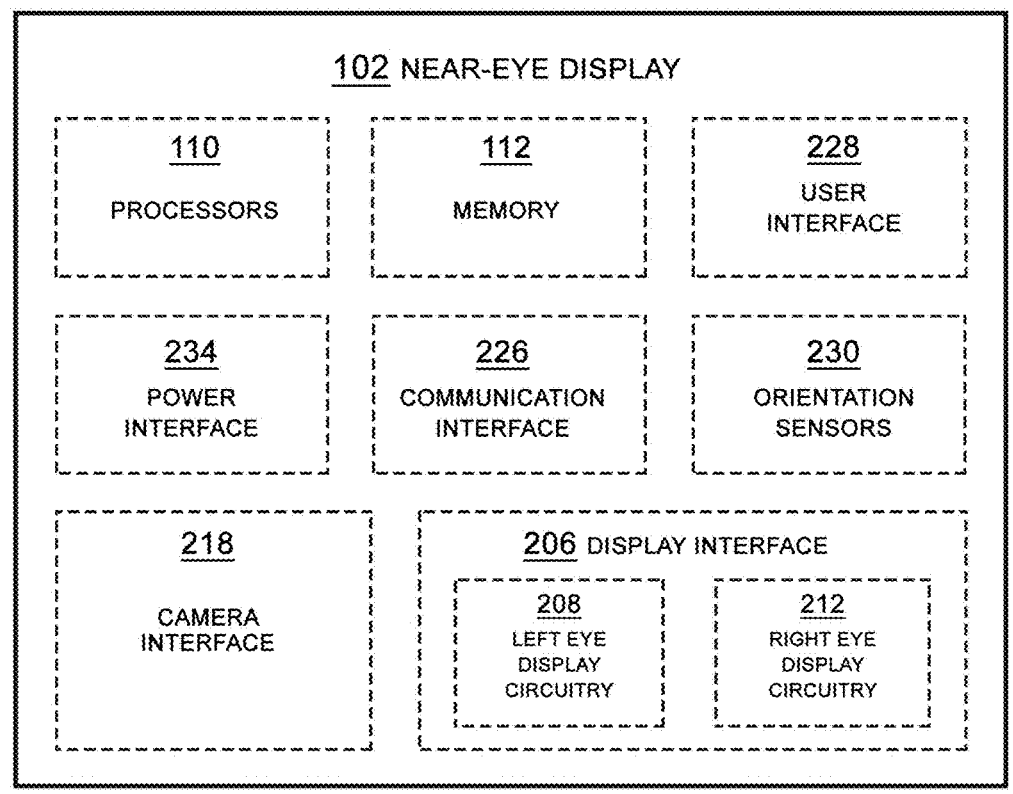
FIG. 2A is a block diagram of components of a near-eye display, in accordance with one or more embodiments of the present disclosure.
Figure 2B:
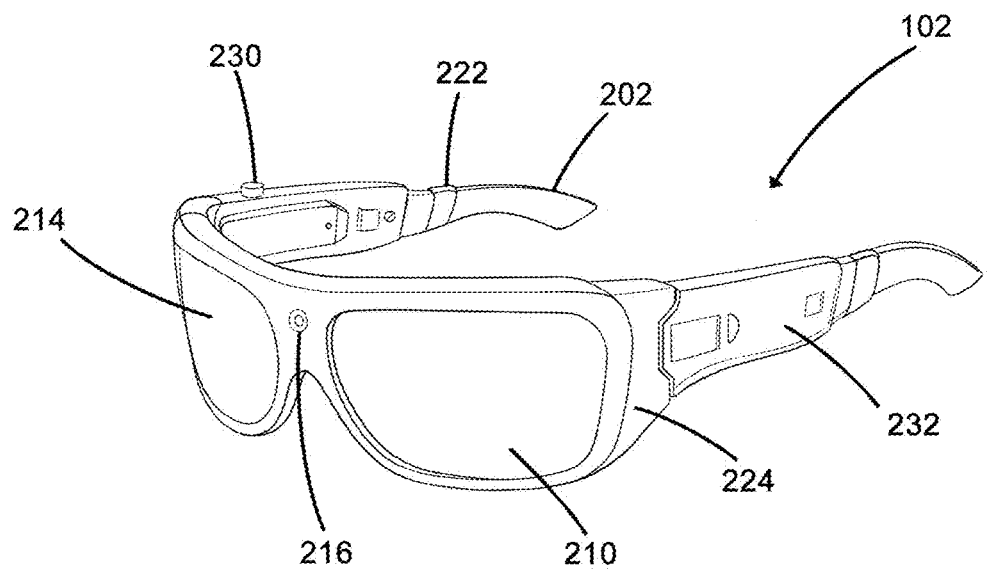
FIG. 2B is a perspective view of mixed-reality glasses including a near-eye display, in accordance with one or more embodiments of the present disclosure.
Figure 2C:
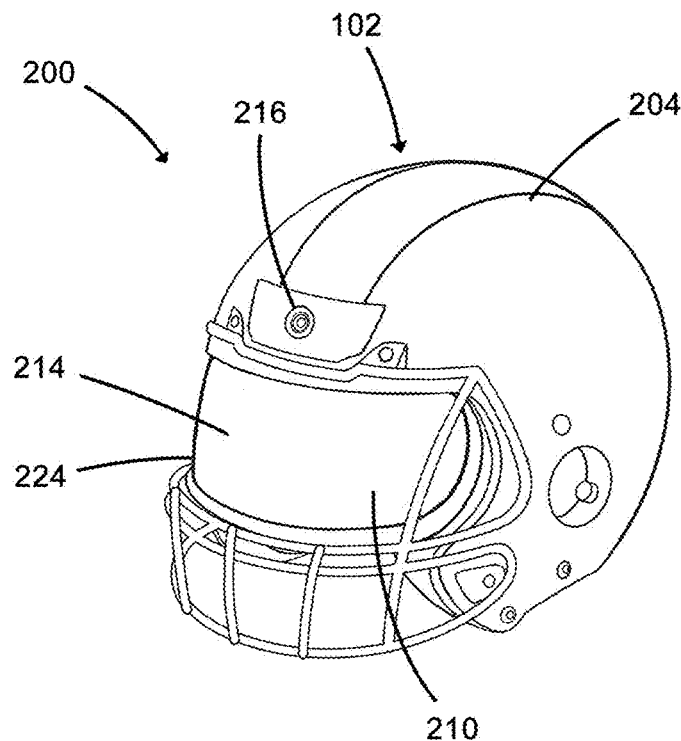
FIG. 2C includes a perspective view and an exploded view of a mixed-reality helmet including a near-eye display, in accordance with one or more embodiments of the present disclosure.
Figure 2C:
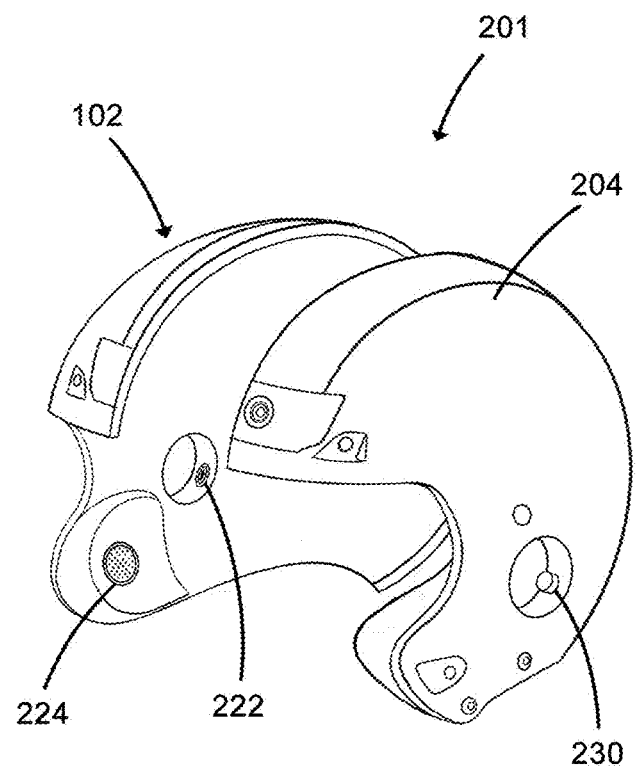

The near-eye display 102 may include any type of mixed-reality display known in the art. Further, the near-eye display 102 may have any form-factor suitable for displaying mixed-reality virtual objects to the user such as, but is not limited to, an eyeglass display device, contact lens display devices, a headset display device, a helmet, or the like. In addition, the near-eye display 102 may be formed using custom components or may be formed at least in part using off-the-shelf components. For example, commercially-available near-eye displays suitable for integration within the mixed-reality kick simulator 100 may include, but are not limited to, a Microsoft HoloLens. FIG. 2A is a block diagram of components of a near-eye display 102, in accordance with one or more embodiments of the present disclosure. FIG. 2B is a perspective view of mixed-reality glasses 202 including a near-eye display 102, in accordance with one or more embodiments of the present disclosure. It is recognized herein that mixed-reality glasses including a near-eye display 102 may provide a light-weight mixed reality interface suitable for a wide range of conditions and practice environments. FIG. 2C includes a perspective view 200 and an exploded view 201 of a mixed-reality football helmet 204 including a near-eye display 102, in accordance with one or more embodiments of the present disclosure. It is recognized herein that a football helmet including a near-eye display 102 may provide mixed-reality simulation and training in a user-experience similar to a real-world kicking experience. Further, the near-eye display 102 may be discretely integrated into a football helmet such that the components of the near-eye display 102 may not distract or provide discomfort to the user during a kick. In addition, a helmet including a near-eye display 102 may be indistinguishable from a standard helmet such that such that others may be unaware that the user 114 is using the mixed-reality kick simulator 100.

In one embodiment, the near-eye display 102 includes one or more processors 110 and/or a memory medium 112. In this regard, the controller 108 may be at least partially integrated within the near-eye display 102. For example, processors 110 of the near-eye display 102 may perform various processing tasks described throughout the present disclosure such as, but not limited to, identifying physical objects within a field of view of the user or rendering virtual objects for display to the user 114 based on a field of view and/or a gaze direction of the user 114.

In another embodiment, the near-eye display 102 includes a display interface 206 including left-eye display circuitry 208 configured to drive a left-eye display element 210 and right-eye display circuity 212 configured to drive a right-eye display element 214. In this regard, the display interface 206 may selectively display virtual objects to the left and/or the right eye of the user 114. For example, the display interface 206 may include one or more light projectors (not shown), driven by the left-eye display circuitry 208 and the right-eye display circuity 212, to project light visible to the user 114 such that the user 114 may view the virtual objects within the user's field of view.

The left-eye display element 210 and the right-eye display element 214 may include any type of display elements suitable for presenting a mixed-reality environment to a user 114. In another embodiment, the left-eye display element 210 and the right-eye display element 214 may include a partially-transparent material to allow the user 114 to view real-world objects such as the ball 116 through the near-eye display 102 and simultaneously facilitate the display of virtual objects to the user 114. For example, as illustrated in FIG. 2B, the left-eye display element 210 and the right-eye display element 214 may include a partially-transparent material formed as lenses of mixed-reality glasses 202. By way of another example, as illustrated in FIG. 2C, the left-eye display element 210 and the right-eye display element 214 may include a partially-transparent material mounted to a faceplate of a mixed-reality football helmet 204.

Further, the partially-transparent material may include any type of material. In one embodiment, the left-eye display element 210 and the right-eye display element 214 are formed from a glass material such as, but not limited to, a glass material or a plastic material. In another embodiment, the left-eye display element 210 and the right-eye display element 214 may include one or more coatings. For example, the left-eye display element 210 and the right-eye display element 214 may include anti-reflection and/or anti-glare coatings to provide a comfortable viewing experience. By way of another example, the left-eye display element 210 and the right-eye display element 214 may include a polarization coating to transmit or reflect select polarizations of light. Further, the left-eye display element 210 and the right-eye display element 214 may provide variable transparency through any technique known in the art such as, but not limited to, selective polarization of light. For example, it may be desirable to provide relatively high transparency when a user 114 is required to see and/or interact with physical objects such as the ball 116. By way of another example, it may be desirable to provide relatively low transparency when projecting an opaque virtual scene to the user 114 such as, but not limited to, after the ball 116 has been kicked and motion of a virtual ball through a virtual scene is presented to the user 114.

Further, the display interface 206 may display virtual objects using any technique known in the art. In one embodiment, the display interface 206 projects light associated with virtual reality objects onto the left-eye display element 210 and/or the right-eye display element 214 such that the left-eye display element 210 and/or the right-eye display element 214 operate as a screen within the a portion of the field of view. In another embodiment, the display interface 206 projects light associated with virtual reality objects directly onto the retinas of the user 114. In this regard, the left-eye display element 210 and/or the right-eye display element 214 may operate as mirrors that direct light into the eyes of the user 114.

In another embodiment, the near-eye display 102 includes an integrated camera 216 for photometric positional detection driven by a camera interface 218. In another embodiment, the near-eye display 102 includes one or more orientation sensors 220 to determine the head orientation and/or gaze direction in three-dimensional space. For example, the near-eye display 102 may include an inertial measurement unit (IMU) for sensing angular and/or linear rate of change and/or magnetic orientation. By way of another example, the near-eye display 102 includes Global Positioning System (GPS) sensors for satellite detection of position of the near-eye display 102 relative to the earth.

In another embodiment, the near-eye display 102 includes an audio output component 222 and/or a microphone 224 for audio interaction with the user 114. For example, the audio output component 222 may include, but is not limited to, a speaker or fitted earphones to provide audio feedback to the user. The audio feedback may include, but is not limited to, voice narration, commands, instructions, or sound effects. By way of another example, the microphone 224 may allow the user 114 to provide voice commands and/or interact with other users within a virtual environment. The microphone 224 may further monitor external sounds, such as the impact with the ball 116, the landing of the ball 116, breathing patterns of the user 114, or the like.

In another embodiment, the near-eye display 102 includes a communication interface 226 to communicate with additional components of the mixed-reality kick simulator 100 such as the ball-tracking sub-system 104, the user-tracking sub-system 106, or an external controller 108. The communication interface 226 may include circuity (e.g., transmitters, receivers, buffers, amplifiers, filters, or the like) for any type of wired or wireless communication standard known the art such as, but not limited to, WiFi, Bluetooth 4.0 (including Bluetooth Low Energy (BLE)), Bluetooth 5.0, Bluetooth Low Energy (BLE), Zigbee, XBee, ZWave, or a custom standard.

It is recognized herein that various communication bands such as, but not limited to, bands associated with cellular phone communication, WiFi, or Bluetooth may become crowded and/or noisy in public places such as athletic stadiums during a game. In this regard, a communication interface 226 operating on a crowded or noisy communication band may exhibit decreased performance. Further, it may be desirable to provide communication over distances at least as long as an athletic field. For example, a user 114 may roam around a field, while the near-eye display 102 communicates to an external controller 108 (e.g., providing at least a portion of processing power required to perform steps described throughout the present disclosure) located at a fixed location. Accordingly, it is contemplated herein that a communication interface 226 of a mixed-reality kick simulator 100 may support a broad range of communication techniques across a wide range of frequency bands and that different communication techniques and/or frequency bands may be selected for different applications and intended uses. In one embodiment, the communication interface 226 includes circuitry for communication using multiple communication bands and/or standards. Further, the communication interface 226 may scans multiple communication bands and select a communication band and/or standard to facilitate a high signal to noise ratio. In another embodiment, the communication interface 226 includes circuitry for spread-spectrum communication techniques such as, but not limited to, frequency-hopping, time-hopping, direct-sequence, or chirp-based spread spectrum techniques. It is recognized herein that spread-spectrum communication may provide various benefits including, but not limited to, resistance to interference from crowded bands and a capacity for long-range communication. For example, the communication interface 226 may provide spread-spectrum communication over public wireless frequencies such as, but not limited to, 900 MHz bands to provide long range (e.g., up to 20 miles) communication.

In another embodiment, the near-eye display 102 includes a user interface 228 to facilitate user interaction. For example, the user interface 228 may include circuitry for providing a series of menus with user-selectable options such that a user 114 may navigate through the menus and adjust the configuration of the mixed-reality kick simulator 100. By way of another example, the user interface 228 may include buttons, sliders, toggle switches, or touch sensors for tactile interaction. The components of the user interface 228 may be located on any user-accessible portion of the near-eye display 102. such as, but not limited to, a frame of mixed-reality glasses 202 (FIG. 2B) or within an opening of a mixed-reality football helmet 204 (FIG. 2C). For instance, as illustrated in FIGS. 2B, the user interface 228 may include one or more buttons 230 or a touch-sensitive slider 232. In this regard, the user 114 may slide a finger along the slider 232 to quickly adjust the display of the mixed reality scene such as, but not limited to, adjusting a user location on a mixed-reality field to select a kick at a specific yard line, adjusting the volume of crowd noise, or scroll through menus. The user 114 may then make selections by pressing the buttons 230, tapping the slider 232, or the like. By way of another example, the user interface 228 includes the microphone 224 to accept audio commands. By way of another example, the user interface 228 includes an eye-tracking camera and associated circuitry suitable for determining the gaze direction of the user 114. For instance, the eye-tracking camera may be integrated with the Accordingly, a user 114 may interact with the near-eye display 102 through a series of eye-based gestures such as, but not limited to, eye movements to indicate scrolling and long blinks to indicate selection of the last-viewed item. In another embodiment, the user interface 228 may include a communicatively coupled device such as, but not limited to, a mobile phone, a tablet computing device, or a laptop that communicates with the near-eye display 102 via the communication interface 226. In this regard, the user 114 may adjust the mixed reality environment provided by the near-eye display 102 in a program, an application (e.g., an "app"), through a web-based interface, or the like.

In another embodiment, the near-eye display 102 includes a power interface 234. For example, the power interface 234 may include a battery such as, but not limited to rechargeable lithium ion or nickel-cadmium batteries. By way of another example, the power interface 234 may include of battery charging circuity suitable for charging a rechargeable battery. For instance, the power interface 234 may include a receptacle to receive a wired power cord. In another instance, the power interface 234 may include circuitry for wireless battery charging.

In another embodiment, the ball-tracking sub-system 104 is positioned (e.g., by the user 114) to track the ball 116 as it is kicked by the user 114. For example, the ball-tracking sub-system 104 may be configured to track the ball 116 over the launch window starting at a selected time prior to impact and ending at a selected time after the kick. In this regard, the user 114 may operate the mixed-reality kick simulator 100 in a location where the travel distance of the ball 116 is limited (e.g., by a containment device 116 including a net, a tether, or the like). Accordingly, the launch window over which the ball-tracking sub-system 104 tracks the ball 116 may end at or before the time at which the motion of the ball 116 is impeded by the containment device 116.

Figure 1C:
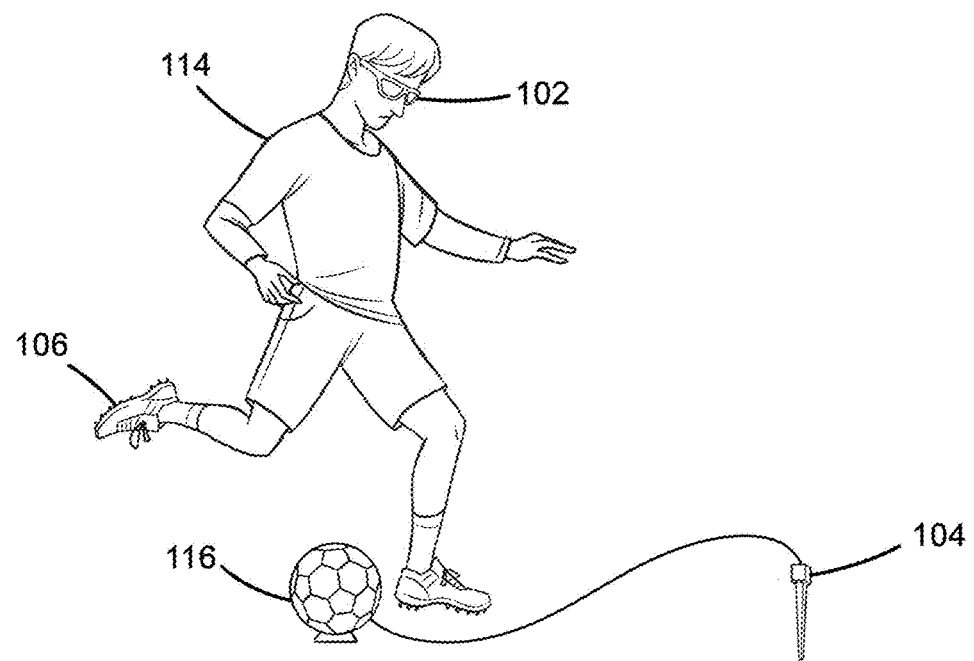
FIG. 1C is a conceptual view of a user kicking a tethered soccer ball, in accordance with one or more embodiments of the present disclosure.
Figure 3A:
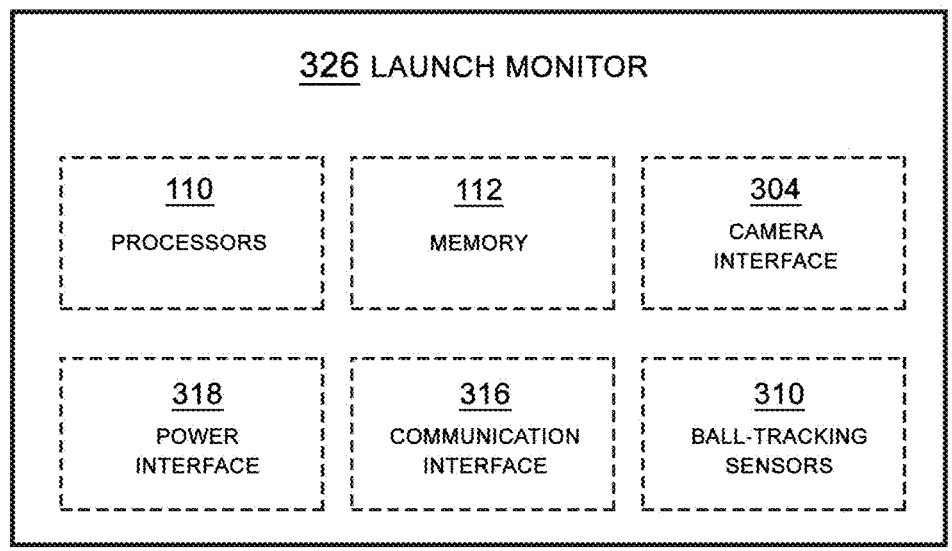
FIG. 3A is a block diagram of components of a ball-tracking sub-system, in accordance with one or more embodiments of the present disclosure.
Figure 3B:
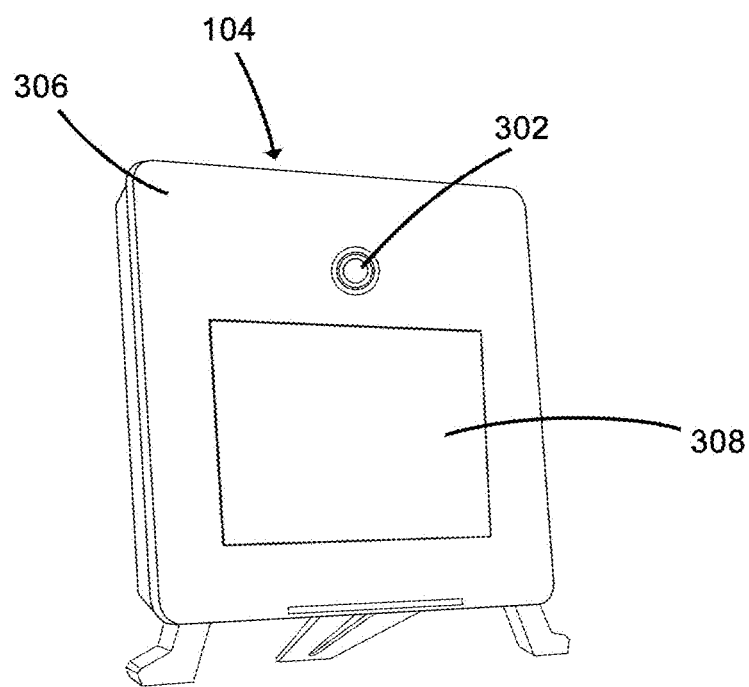
FIG. 3B is a perspective view of a ball-tracking sub-system with a camera configured to be positioned by the user to capture images and/or video of the ball during a kick, in accordance with one or more embodiments of the present disclosure.
Figure 3C:
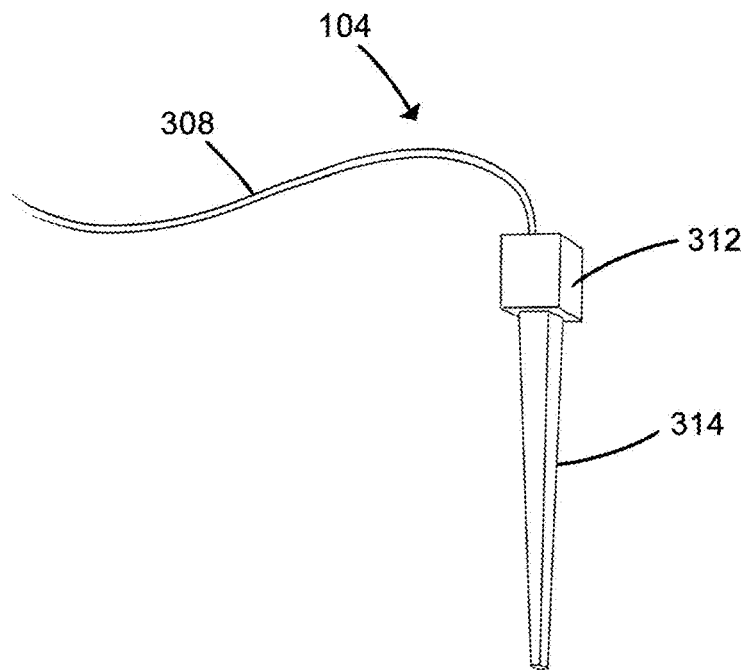
FIG. 3C is a perspective view of a ball-tracking sub-system with a tether to be fastened to a ball, in accordance with one or more embodiments of the present disclosure.
Figure 3D:
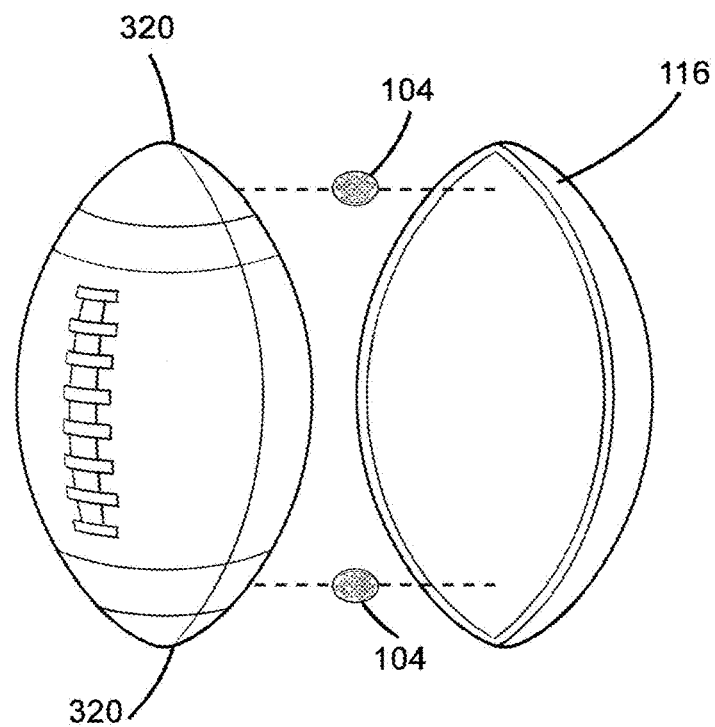
FIG. 3D is an exploded view of a ball-tracking sub-system 104 integrated near the ends of a football, in accordance with one or more embodiments of the present disclosure.
Figure 3E:
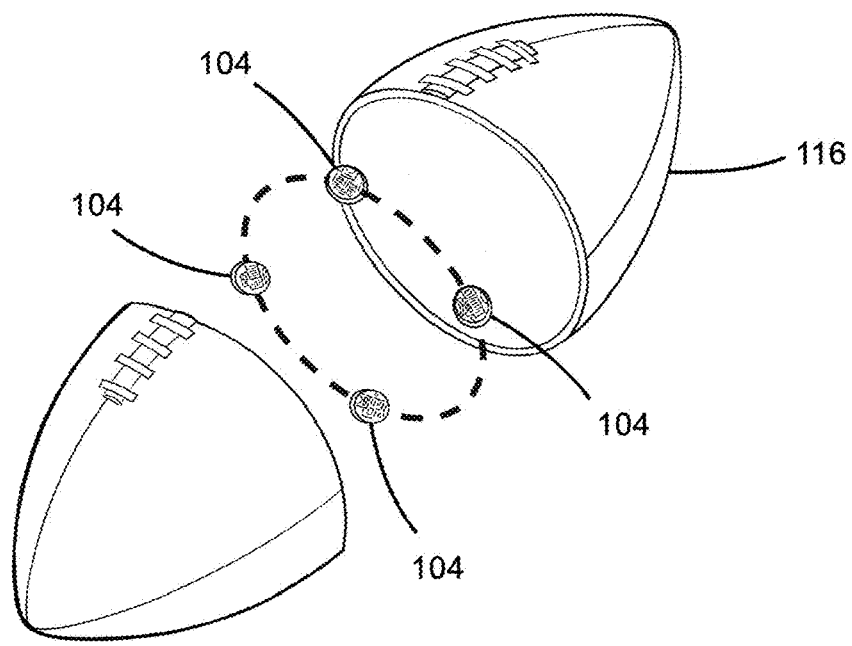
FIG. 3E is an exploded view of a ball-tracking sub-system 104 integrated around a central region of the football, in accordance with one or more embodiments of the present disclosure.
Figure 3F:
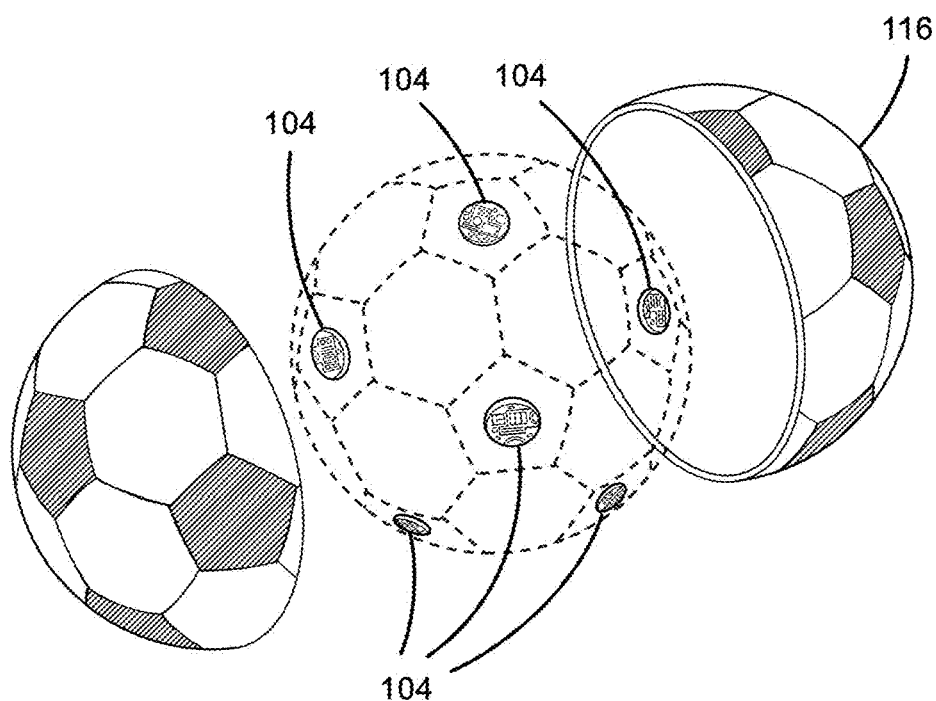
FIG. 3F includes an exploded view of a ball-tracking sub-system distributed throughout a ball, in accordance with one or more embodiments of the present disclosure.

Referring now to FIGS. 3A through 3D, the ball-tracking sub-system 104 may include any number or type of components known the art suitable for tracking a ball 116 over a selected launch window. Further, the components of the ball-tracking sub-system 104 may be configured with any form-factor. In addition, the ball-tracking sub-system 104 may be formed using custom components or may be formed at least in part using off-the-shelf components. For example, commercially available ball-tracking products suitable for integration within the mixed-reality kick simulator 100 may include, but are not limited to, products provided by Flight-Scope, Trackman, Foresight Sports, or Ernest Sports. FIG. 3A is a block diagram of components of a ball-tracking sub-system 104, in accordance with one or more embodiments of the present disclosure. FIG. 3B is a perspective view of a ball-tracking sub-system 104 with a camera 302 configured to be positioned by the user 114 to capture images and/or video of the ball 116 during a kick (e.g., as illustrated in FIG. 1B), in accordance with one or more embodiments of the present disclosure. FIG. 3C is a perspective view of a ball-tracking sub-system 104 with a tether 308 to be fastened to a ball 116 (e.g., as illustrated in FIG. 1C), in accordance with one or more embodiments of the present disclosure. FIGS. 3D and 3E include exploded views of a ball-tracking sub-system 104 integrated near the ends and around a central region of a football 116, respectively, in accordance with one or more embodiments of the present disclosure. FIG. 3F includes an exploded view of a ball-tracking sub-system 104 distributed throughout a ball 116 (e.g., a soccer ball), in accordance with one or more embodiments of the present disclosure.

In one embodiment, the controller 108 may be fully or partially integrated into the ball-tracking sub-system 104. In another embodiment, the controller 108 is at least partially distributed to additional components of the mixed-reality kick simulator 100 such as the near-eye display 102 or the user-tracking sub-system 106. For example, it may be the case that the additional system components may have increased processing and/or memory capabilities such that the performance of the mixed-reality kick simulator 100 may be improved by offloading at least a portion of processing steps described throughout the present disclosure. In another embodiment, the controller 108 is at least partially distributed to a mobile computing device such as, but not limited to, a mobile phone or a laptop communicatively coupled to or integrated within the mixed-reality kick simulator 100.

In one embodiment, the ball-tracking sub-system 104 includes camera interface 304 to receive images and/or video of the ball 116 from the camera 302. For example, as illustrated in FIG. 3A, the ball-tracking sub-system 104 may include one or more stand-alone units 306 configured to be placed near the ball 116. In one instance, as illustrated in FIG. 1B, a ball-tracking sub-system 104 may be placed with a camera 302 orthogonal to a kicking plane (e.g., a plane defined by the ground and a kicking direction) to generate a side view of the kick. In another embodiment, the ball-tracking sub-system 104 may be placed with a camera 302 configured to view the kick from the perspective of the user 114. For example, the camera 216 of the near-eye display 102 may operate as a ball-tracking sub-system 104. Further, the mixed-reality kick simulator 100 may generally include more than one ball-tracking sub-system 104 to provide more than one camera 302 suitable for viewing various aspects of a kick from multiple angles such as to facilitate accurate tracking of the ball 116. For instance, the camera 302 may capture the movement of a user's foot prior to impacting the ball 116, the impact of the foot with the ball 116 including the location at which the foot impacts the ball 116, deformation of the ball 116 during the kick, In another embodiment, the ball-tracking sub-system 104 includes a display 308. For example, the display 308 may visualize the images and/or video from the camera 302. Accordingly, the user 114 may utilize the images and/or video to position the ball-tracking sub-system 104 at a suitable location to view the ball 116 during a kick. In one embodiment, the ball-tracking sub-system 104 may store images and/or video captured during a kick such that the user 114 may play back the captured images and/or video to analyze kicking technique. The display 308 may be any type of display known in the art such as, but not limited to, a liquid crystal display (LCD), a light-emitting diode (LED) display, or an organic light-emitting diode (OLED) display. In another embodiment, the display 308 is a touch-sensitive display providing an interactive user interface.

In another embodiment, the ball-tracking sub-system 104 includes one or more additional user interface components such as, but not limited to, buttons, sliders or switches suitable for receiving user input for configuration and/or operation.

In another embodiment, the ball-tracking sub-system 104 includes one or more dedicated ball-tracking sensors 310 to gather data regarding one or more aspects of the motion of the ball 116 during and after a kick. The ball-tracking sensors 310 may generally include any type of sensor known in the art. Further, the ball-tracking sensors 310 may generate stand-alone data or may rely on other components such as, but not limited to, the camera 302.

In one embodiment, the ball-tracking sensors 310 include range-finding sensors configured to track the position of the ball 116 over the launch window. For example, the ball-tracking sensors 310 may include a range finder. In this regard, the ball-tracking sensors 310 may emit a signal in the direction of the ball 116, detecting a reflected signal from the ball 116, and determine the distance to the ball 116 by monitoring the time of flight of the signal. For instance, a ball-tracking sensors 310 may include a Radio Detection and Ranging (RADAR) system utilizing radio-frequency pulses for range finding. Accordingly, a RADAR system may include a source of radio-frequency pulses of any selected frequency or range of frequencies, a radio-frequency transmitter to transmit the radio-frequency pulses, and a radio-frequency receiver to detect reflected radio-frequency pulses. In another instance, ball-tracking sensors 310 may include a Light Detection and Ranging (LIDAR) system utilizing light-pulses for range-finding. Accordingly, a LIDAR system may include a light source to generate pulses of light with any selected wavelength or range of wavelengths, one or more lenses to project the light pulses and capture light reflected from the ball 116, and a light detector to detect the captured light pulses. The light source may include any source known in the art such as, but not limited to a laser source. Accordingly, ball-tracking sensors 310 incorporating laser-based range-finding may be characterized as Laser Detection and Ranging (LADAR) systems.

In another embodiment, the ball-tracking sensors 310 include one or more velocity sensors to track the velocity of the ball 116. For example, the ball-tracking sensors 310 may include Doppler sensors to determine velocity of the ball 116 based on shifts in the wavelength (or frequency) of a signal reflected from the ball 116 (e.g., Doppler shifts that are a function of the velocity and direction of motion relative to the sensor). Further, Doppler sensors may utilize pulses of radio waves or light pulses and may be integrated with a range-tracker described above through the addition of a wavelength-sensitive (or frequency-sensitive) detector such as a spectrometer.

In another embodiment, the ball-tracking sensors 310 may include a force sensor attached to the ball 116. For example, as illustrated in FIGS. 1C and 3B, a ball-tracking sub-system 104 may include a force sensor 312 (e.g., a strain gauge, or the like) attached to the ball 116 by a tether 308 and secured to the ground (e.g., by stake 314). Accordingly, the kicked ball 116 may travel along an initial trajectory for the length of a tether 308 and will then be stopped by the tether 308, which will produce a measurable force that may be detected using the force sensor 312. Further, data associated with the velocity and/or acceleration of the ball 116 at the end of the launch window may be determined by the force sensor 312.

The tether 308 may be secured to the ball 116 using any method known in the art. For example, the tether 308 may include, but is not limited to, rope, string, or wire. By way of another, the tether 308 may be attached to the ball 116 by a removable harness enabling the user 114 to use any type of ball 116 with the mixed-reality kick simulator 100. By way of another example, the tether 308 may be permanently attached to the ball 116 at one or more attachment points. In this regard, a user 114 may use a dedicated ball 116 designed for use with the mixed-reality kick simulator 100.

In another embodiment, the ball-tracking sensors 310 include weather-monitoring sensors. It is recognized herein that weather conditions such as, but not limited to, air temperature, air pressure, wind speed, and precipitation (fog, rain, snow, sleet, or the like) may impact the trajectory of a kicked ball. Accordingly, the ball-tracking sensors 310 may include weather-monitoring sensors such as, but not limited to air temperature sensors, air pressure sensors, wind speed sensors, or precipitation sensors.

In another embodiment, the ball-tracking sub-system 104 includes a communication interface 316 to communicate with additional components of the mixed-reality kick simulator 100 such as the near-eye display 102, the user-tracking sub-system 106, or an external controller 108. The communication interface 316 may include circuity (e.g., transmitters, receivers, buffers, amplifiers, filters, or the like) for any type of wired or wireless communication standard known the art such as, but not limited to, WiFi, Bluetooth 4.0 (including Bluetooth Low Energy (BLE)), Bluetooth 5.0, Bluetooth Low Energy (BLE), Zigbee, XBee, ZWave, or a custom standard. In a general sense, the communication interface 316 may include any of the same or complementary communication technologies as the communication interface 226 of the near-eye display 102 described previously herein such as, but not limited to, channel-scanning technology or spread-spectrum communication.

In another embodiment, the ball-tracking sub-system 104 includes a power interface 318. For example, the power interface 318 may include a battery such as, but not limited to rechargeable lithium ion or nickel-cadmium batteries. By way of another example, power interface 318 may include of battery charging circuity suitable for charging a rechargeable battery. For instance, the power interface 318 may include a receptacle to receive a wired power cord. In another instance, the power interface 318 may include circuitry for wireless battery charging.

In another embodiment, one or more components of the ball-tracking sub-system 104 is integrated on or within the ball 116. For example, the ball 116 may include reflective tape to facilitate the reflection of signals from ground-based ball-tracking sensors 310 (e.g., range-finders, Doppler sensors, or the like). By way of another example, as illustrated in FIGS. 3D through 3F, the ball 116 may include one or more ball-tracking sensors 310 to generate data within the ball 116 that may be communicated (e.g., via the communication interface 316) to additional components of the mixed-reality kick simulator 100 such as the near-eye display 102, a stand-alone ball-tracking sub-system 104, an external controller 108, or the like.

The ball-tracking sensors 310 may be placed at any number of locations throughout the ball 116 suitable for providing ball-tracking information (e.g., forces on the ball 116, location, speed, acceleration, rotation, or the like). Further, it is recognized herein that it may be desirable that the ball-tracking sensors 310 have minimal impact on the trajectory of the ball 116 such that the mixed-reality kick simulator 100 may provide accurate simulations of a traditional ball 116. In one embodiment, ball-tracking sensors 310 located within the ball 116 are distributed so as to mitigate any impact on the center of mass of the ball 116.

Referring now to FIG. 3D, ball-tracking sensors 310 may be, but are not required to be, located near one or both of the ends 320 of a football 116 (e.g., an American-rules football, an Australian-rules football, or the like). It is recognized herein that a ball 116 may deform during a kick. In this regard, placement of ball-tracking sensors 310 near the ends 320 may mitigate the displacement of the ball-tracking sensors 310 during a kick, which may facilitate measurements of ball-tracking data such as, but not limited to, initial velocity, acceleration, or rotation during the impact.

Referring now to FIGS. 3E and 3F, ball-tracking sensors 310 may be, but are not required to be, distributed throughout the ball 116. For example, as illustrated in FIG. 3E ball-tracking sensors 310 may be distributed evenly (e.g., four evenly spaced sensors as illustrated in FIG. 3E) around a circumference of a football 116. In this regard, placement of ball-tracking sensors 310 may facilitate measurement of ball-tracking data at an anticipated point of impact and deformation during the kick. By way of another example, as illustrated in FIG. 3F, ball-tracking sensors 310 may be distributed in any pattern throughout a ball 116. In this regard, the placement of the ball-tracking sensors 310 may facilitate accurate data regardless of the point of impact of the kick.

It is to be understood, however, that the illustrations in FIGS. 3D through 3F are provided solely for illustrative purposes and should not be interpreted as limiting. The ball-tracking sensors 310 may be placed at any number of selected locations throughout the ball 116 to facilitate the collection of ball-tracking data. In one embodiment, ball-tracking sensors 310 are uniformly distributed around the circumference of the ball 116 at the locations of white stripes found on some football designs. In another embodiment, ball-tracking sensors 310 are distributed in a wire-frame pattern or mesh pattern around the ball 116. In another embodiment, a ball 116 includes a single ball-tracking sensor 310 that may be disposed at any selected location such as, but not limited to, behind the laces or in one of the ends 320.

In one embodiment, the ball-tracking sensors 310 include, but are not limited to, an inertial measurement unit (IMU) including any combination of accelerometers, orientation sensors, electromagnetic sensors, or magnetometers to measure and generate data associated with the acceleration, orientation, and/or rotation of the ball 116. By way of another example, the ball-tracking sensors 310 may include an altimeter to determine the height of the ball with respect to the ground. By way of another example, the ball-tracking sensors 310 may include a global positioning system (GPS) device configured to determine the position of the ball in three-dimensional coordinates.

In another embodiment, the system includes a user-tracking sub-system 106 including one or more sensors to monitor the motion of the user 114 during a kick. It is recognized herein that the motion of the user including the body position and body movement critically impact the mechanics of a kick. Accordingly, the user-tracking sub-system 106 may monitor and generate user motion data associated with one or more aspects of the body of the user 114 before, during, or after a kick. This user motion data during a kick may then be correlated with the trajectory of the ball 116 to provide a comprehensive kick analysis dataset associated with each kick.

The user-tracking sub-system 106 may be provided as one or more stand-alone devices (e.g., stand-alone device 306, or the like) or may be at least partially integrated with other system components such as the ball-tracking sub-system 104 or the near-eye display 102. For example, as illustrated in FIG. 1B, the user-tracking sub-system 106 may include the camera 302 described previously herein associated with the ball-tracking sub-system 104. In this regard, the user-tracking sub-system 106 may track the motion of the user and generate data such as, but not limited to, a trajectory of a kicking foot, foot speed, a number of steps taken by the user 114 leading up to a kick, or positions of the steps taken by the user 114 leading up to the kick. By way of another example, the user-tracking sub-system 106 may include one or more wearable sensors worn by the user 114. For instance, the user-tracking sub-system 106 may include the near-eye display 102 to generate positional information of the user 114 during a kick. In another instance, the user-tracking sub-system 106 may include one or more sensor pads (not shown) embedded within shoes worn by the user 114 (e.g., shoes 118 in FIGS. 1B and 1C). The sensor pads may include any type of sensor suitable for tracking user motion such as, but not limited to, a pressure sensor, an inertial measurement unit (IMU), a pedometer, or the like. In this regard, the user-tracking sub-system 106 may track user data such as, but not limited to, a number of steps, a gait of a user both naturally and during a kick, foot speed, foot trajectory, or the like. In another instance, the user-tracking sub-system 106 may include wearable sensors to be distributed across the body of the user 114. In this regard, the user-tracking sub-system 106 may gather user movement data of various parts of the body such as, but not limited to, hip movement, arm motion, or body posture during a kick.

In another embodiment, the controller 108 receives tracking data from the ball-tracking sub-system 104 over the launch window and determines a predicted trajectory of the ball 116 after the launch window. The controller 108 may determine the predicted trajectory of the ball 116 using any technique known in the art. For example, the controller 108 may include a physics engine suitable for generating a predicted trajectory based in input data from the ball-tracking sub-system 104 (including ball data and weather data) and/or the user-tracking sub-system 106 as initial conditions. Further, the controller 108 may utilize a virtual environment selected by the user 114 or measurements of the physical environment to determine the landing position of the ball 116.

In one embodiment, the mixed-reality kick simulator 100 may save (e.g., in the memory medium 112) kick analysis data from the user-tracking sub-system 106 and/or the ball-tracking sub-system 104 for each kick or for any user-selected kick or series of kicks. Further, the kick analysis data may be analyzed by the user 114 and/or by the controller 108 to correlate user motion data from the user-tracking sub-system 106 with ball data from the ball-tracking sub-system 104 and/or predicted trajectory data from the controller 108.

Figure 4:
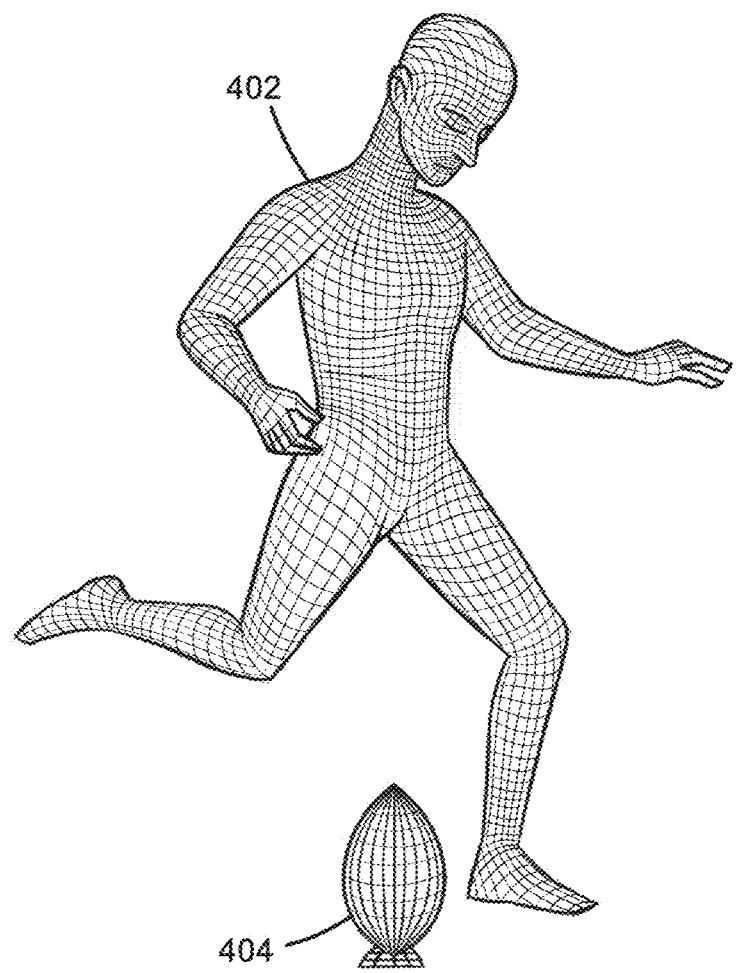
FIG. 4 is a perspective view of an avatar representing a user during a kick, in accordance with one or more embodiments of the present disclosure.

Further, the mixed-reality kick simulator 100 may present the kick analysis data to the user 114 as mixed-reality objects through the near-eye display 102. FIG. 4 is a perspective view of an avatar 402 representing a user 114 during a kick, in accordance with one or more embodiments of the present disclosure. In one embodiment, the near-eye display 102 may display an avatar 402 performing the motion of the user 114 during a selected kick as well as the predicted trajectory of a virtual ball 404 as virtual objects. Further, the near-eye display 102 may display relevant kick analysis data associated with the kick (e.g., launch angle, launch velocity, rotation, impact point on the ball, leg speed, foot placement, or the like). In this regard, the user 114 may move around the avatar and view the motions and relevant data associated from multiple viewpoints.

In another embodiment, the mixed-reality kick simulator 100 may learn the natural kicking motions and techniques of the user 114 over time through continued use of the mixed-reality kick simulator 100 and may correlate the impact of specific body movements during a kick to the resulting trajectory of the ball 116. Accordingly, the mixed-reality kick simulator 100 may identify specific aspects of user motion during a kick that substantially impact on the outcome of the kick and provide user-customized coaching data to assist the user in modifying kicking technique. For example, the near-eye display 102 may sequentially or simultaneously display avatars 402 illustrating past kicks with different outcomes to provide a side-by-side comparison of the user motion and corresponding trajectories. By way of another example, the near-eye display 102 may display an avatar 402 of the user going through a suggested motion as a guide.

Referring now to FIGS. 5 through 8B, the operation of the mixed-reality kick simulator 100 by the user 114 is described in accordance with one or more embodiments of the present disclosure.

Figure 5:
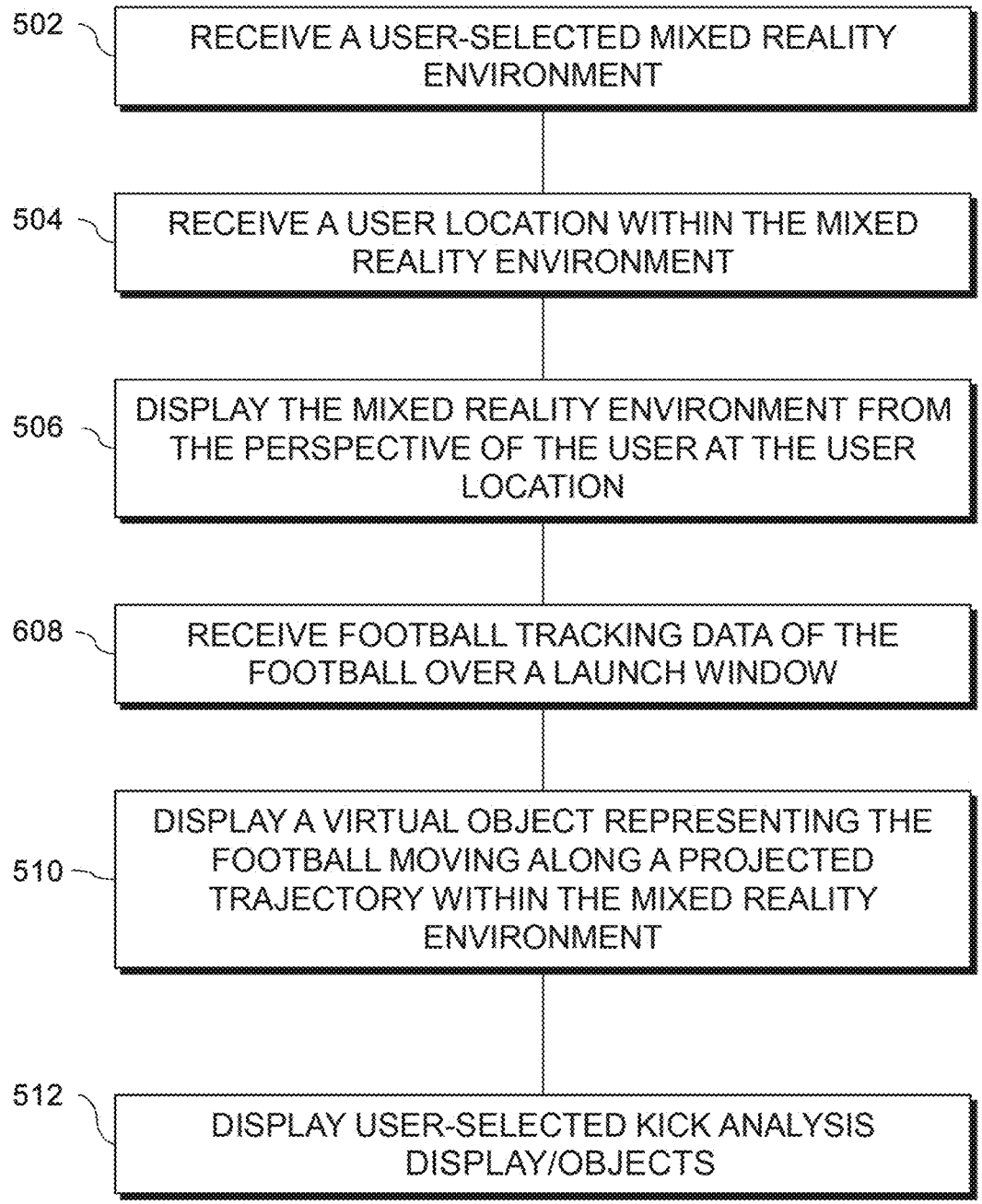
FIG. 5 is a flow diagram illustrating steps performed in a method for mixed-reality kicking simulation, in accordance with one or more embodiments of the present disclosure.

FIG. 5 is a flow diagram illustrating steps performed in a method 500 for mixed-reality kicking simulation, in accordance with one or more embodiments of the present disclosure. Applicant notes that the embodiments and enabling technologies described previously herein in the context of mixed-reality kick simulator 100 should be interpreted to extend to method 500. It is further noted, however, that the method 500 is not limited to the architecture of the mixed-reality kick simulator 100.

In one embodiment, the method 500 includes a step 502 of receiving a user-selected mixed-reality environment. For example, as described previously herein, a user 114 may select any desired combination of virtual elements forming a virtual environment to be displayed on the near-eye display 102. Further, objects in the virtual environment may be displayed based on the head orientation and/or the gaze direction of the user.

For example, a user may select any combination of virtual objects to be displayed along with physical objects visible through the near-eye display 102. In this regard, the mixed-reality environment may include augmented reality objects. By way of another example, the user 114 may select a combination of opaque virtual objects that may represent an immersive virtual scene that occupies at least a portion of the field of view of the user and completely blocks physical objects from view.

In one embodiment, the virtual environment includes virtual objects representing a selected location such as, but not limited to, an open athletic field, a generic stadium, training facilities, or a representation of an actual stadium (e.g., a home stadium of a favorite team of the user, or the like).

In another embodiment, the method 500 includes a step 504 of receiving a user location within the mixed-reality environment. In another embodiment, the method 500 includes a step 506 of displaying the mixed-reality environment from the perspective of the user at the user location.

Figure 6A:
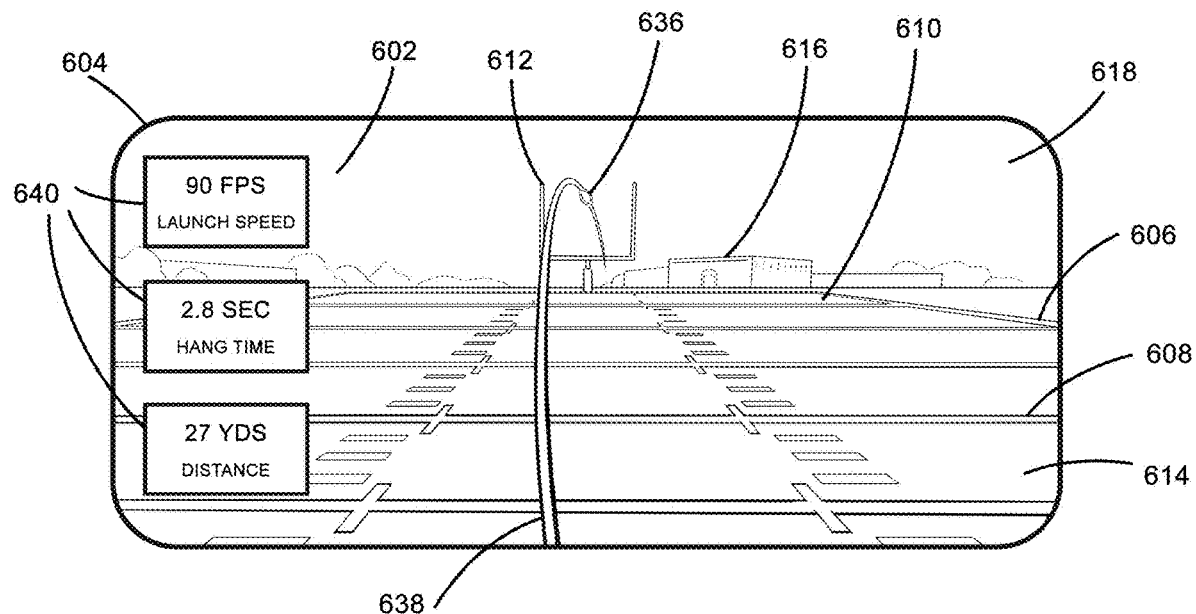
FIG. 6A is a conceptual view of a virtual environment including an American-rules football field from a field of view when looking in a horizontal direction, in accordance with one or more embodiments of the present disclosure.

FIG. 6A is a conceptual view of a virtual environment 602 including an American-rules football field from a field of view 604 when looking in a horizontal direction, in accordance with one or more embodiments of the present disclosure. It is recognized herein that the illustration of an American-rules football field is provided solely for illustrative purposes and should not be interpreted as limiting the present disclosure. Rather, the mixed-reality kick simulator 100 display components of any selected athletic field for any selected sport such as, but not limited to, Australian-rules football, rugby, or soccer. In one embodiment, the virtual environment includes user-selectable virtual objects representing field markings such as, but not limited to, side lines 606, yard lines 608, end zones 610, goal posts 612, seating (not shown), or lights (not shown). In this regard, a user may customize a desired virtual experience. Further, as illustrated in FIG. 6A, the virtual environment may provide the user with a mixed-reality experience. For example, real-world objects such as, but not limited to, the turf 614, background buildings 616, or the sky 618, may be visible to the user 114 and virtual objects may be simultaneously visible overlaid on or integrated with the real-world objects.

In another embodiment, the mixed-reality kick simulator 100 may monitor and map physical objects such that the virtual objects may be displayed in a coordinate system that matches the physical locations of the physical objects in the real-world view of the user 114. Accordingly, the mixed-reality kick simulator 100 (e.g., via the near-eye display 102) may detect the presence of physical objects such as goal posts 612 or field markings (e.g., side lines 606, yard lines 608, end zones 610, or the like) and may display virtual objects of missing objects according to the perspective and location of the user in both the real world and the virtual environment.

The mixed-reality kick simulator 100 may detect and map the locations of physical objects using any technique known in the art. For example, the mixed-reality kick simulator 100 may detect the locations of physical objects using any combination of components of the mixed-reality kick simulator 100 such as, but not limited to, the camera 216 on the near-eye display 102, the camera 216 on a ball-tracking sub-system 104, or any combination of sensors (e.g., range-finding sensors, or the like) located in the near-eye display 102, the ball-tracking sub-system 104, or as stand-alone devices. By way of another example, the mixed-reality kick simulator 100 may accept or prompt for user-assisted locating of physical objects. For instance, the user 114 may engage the user interface 228 while standing at selected boundaries (e.g., sidelines, end zones, or the like). The mixed-reality kick simulator 100 may then generate a virtual coordinate system that corresponds to the physical world such that virtual objects may be properly located alongside real-world objects in a mixed-reality environment.

In another embodiment, a user may select specific virtual objects to supplement the physical objects in the field of view of the user 114. For example, a user on an open grass field may selectively display field markings and goal posts. Accordingly, the turf 614 (e.g., grass) may be a physical object, whereas the field markings (e.g., side lines 606, yard lines 608, end zones 610, or the like) and goal posts 612 are displayed as virtual objects. By way of another example, a user on a practice field with field markings, but no goal posts 612 may selectively display only goal posts 612 in a virtual environment. Accordingly, the turf 614 and field markings may be visible as physical objects, whereas the goal posts 612 may be displayed as virtual objects.

By way of one example, the mixed-reality kick simulator 100 may identify (e.g., with the camera 216, or the like) that the user 114 is on a practice field with marked field markings (e.g., side lines 606, yard lines 608, end zones 610, or the like) and no goal posts 612. Accordingly, the near-eye display 102 may display virtual objects representing goal posts 612 at the end of the field as determined by physical field markings. Further, the size and orientation of the virtual goal posts 612 may be continually adjusted as the user 114 moves around the virtual environment, looks in different directions, or the like based on data provided by the near-eye display 102.

By way of another example, the mixed-reality kick simulator 100 may identify that the user 114 is on a training field with goal posts 612 but no field markings (e.g., side lines 606, yard lines 608, end zones 610, or the like). Accordingly, the near-eye display 102 may display field markings based on location of the goal posts 612 and the current location of the user 114 with respect to the goal posts 612 and may continually update the locations of the field markings as the user 114 moves around the field (e.g., leading up to a kick). For instance, it is recognized herein that the size and placement of goal posts 612 on a football field may be standardized. Accordingly, the mixed-reality kick simulator 100 may determine a distance between the user 114 and the goal posts 612 based on the apparent size and orientation (e.g., related to the viewing angle) of the goal posts 612 as measured by the near-eye display 102 and the standardized size and field placement. In another instance, the user 114 may input the location of the goal posts 612 using the user interface 228 when standing near the goal posts 612.

Further, it is recognized that some training facilities may have a variety of markers and/or visual cues on the field or walls for kickers. Accordingly, the mixed-reality kick simulator 100 may identify the markers and/or visual cues to guide the placement of virtual objects in a mixed-reality environment.

In another embodiment, a user may select immersive virtual scenes that obstruct the real-world view of the user. For example, a user (e.g., in a closed room may select an immersive virtual environment in which a field, field markings, goal posts, and surrounding structures (e.g., lights, seating, or the like) are all virtual.

In another embodiment, a virtual environment may be bounded to a selected set of view vectors (e.g., gaze directions, or the like) that represent lines of sight within a field of view of the user. For example, it may be desirable for the user to accurately view the ball 116 in order to properly execute a kick. Accordingly, the near-eye display 102 may be configured to provide an unobstructed view of the real world when the user is looking down or at the ball 116 and display the virtual environment as the user looks upward (e.g., to aim at a virtual goal prior to a kick and/or as the user follows through after a kick). In this regard, the near-eye display 102 may determine a set of view vectors for a given field of view of the user and selectively display virtual objects (e.g., associated with the virtual environment and/or kick analysis data) only for view vectors above a selected angle. For instance, the selected angle may be, but is not required to be, defined as a selected pitch angle of the head of the user with respect to the horizon.

In another embodiment, a virtual environment may be selectively displayed based on whether or not a kick has occurred. For example, the near-eye display 102 may provide an unobstructed view of the real-world prior to a kick and display one or more virtual objects (e.g., associated with the virtual environment and/or kick analysis data) after a kick.

Figure 6B:
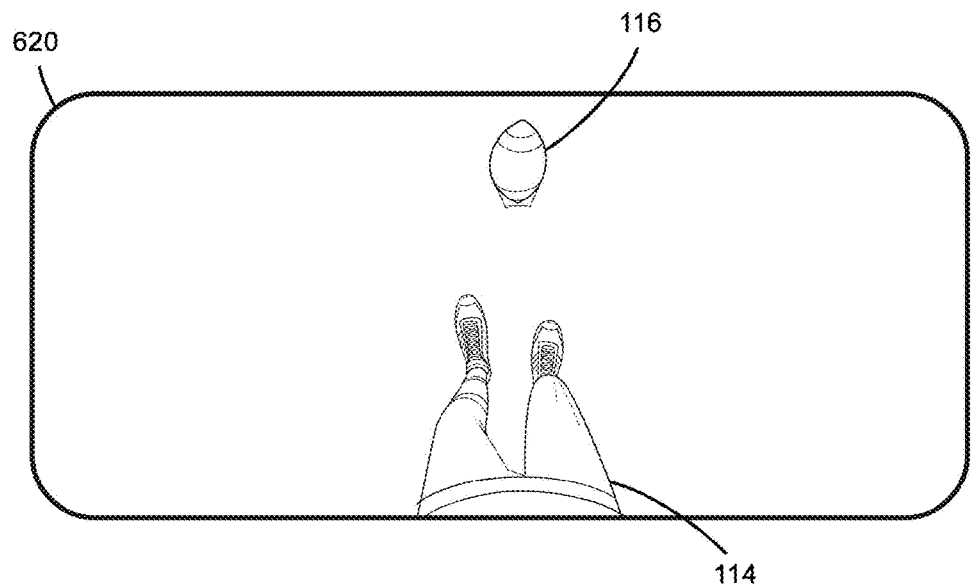
FIG. 6B is a conceptual view of a field of view of a user when looking at a ball, in accordance with one or more embodiments of the present disclosure.

FIG. 6B is a conceptual view of a field of view 620 of a user when looking at the ball 116 (e.g., prior to a kick), in accordance with one or more embodiments of the present disclosure. For example, the user may see the ball 116, the ball-tracking sub-system 104, and a portion of the user's feet and legs.

Figure 6C:
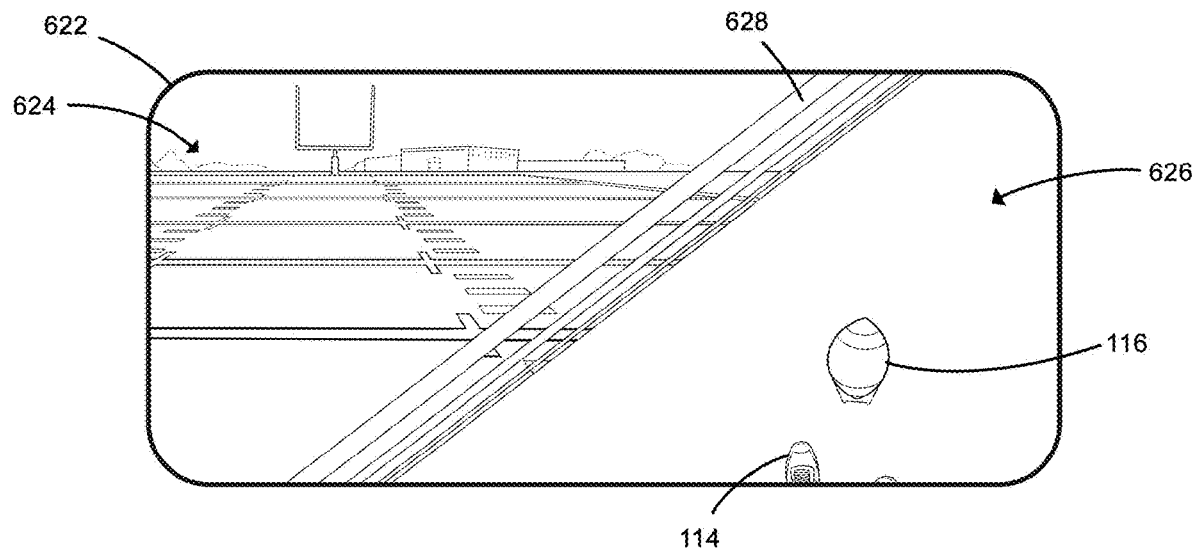
FIG. 6C is a conceptual view of a field of view of a user transitioning between a virtual environment and an unobstructed view of the ball, in accordance with one or more embodiments of the present disclosure.

Further, the near-eye display 102 may provide smooth transitions between different views (e.g., the views of FIG. 6A and FIG. 6B) to provide a seamless experience. In this regard, the user 114 may iteratively look down at the ball 116 and up to view the virtual environment 602 including a mixed reality combination of real or virtual objects such as, but not limited to goal posts 612 and field markings (e.g., side lines 606, yard lines 608, end zones 610, or the like). FIG. 6C is a conceptual view of a field of view 622 of a user transitioning between a virtual environment and an unobstructed view of the ball 116, in accordance with one or more embodiments of the present disclosure. For example, the field of view 622 may be defined by a set of view vectors associated with lines of sight of the user. The near-eye display 102 may then be configured to display virtual objects only for a first portion 624 of the field of view 622 (e.g., a first selected set of lines of sight) and an unobstructed real-world view for a second portion 626 of the field of view 622 (e.g., a second selected set of lines of sight). The transition 628 between the first portion 624 and the second portion 626 of the field of view 622 may be determined by any selected condition. For instance, as illustrated in FIG. 6C, the transition 628 may be, but is not required to be, determined based on a selected angle (e.g., a pitch angle) associated with a head orientation with respect to the horizon. Further, it is to be understood that the transition 628 may be graphically displayed using any technique known in the art such as, but not limited to, a sharp transition line, a blurred transition line, or a progression of interleaved shapes (e.g., lines as illustrated in FIG. 6C).

Figure 6D:
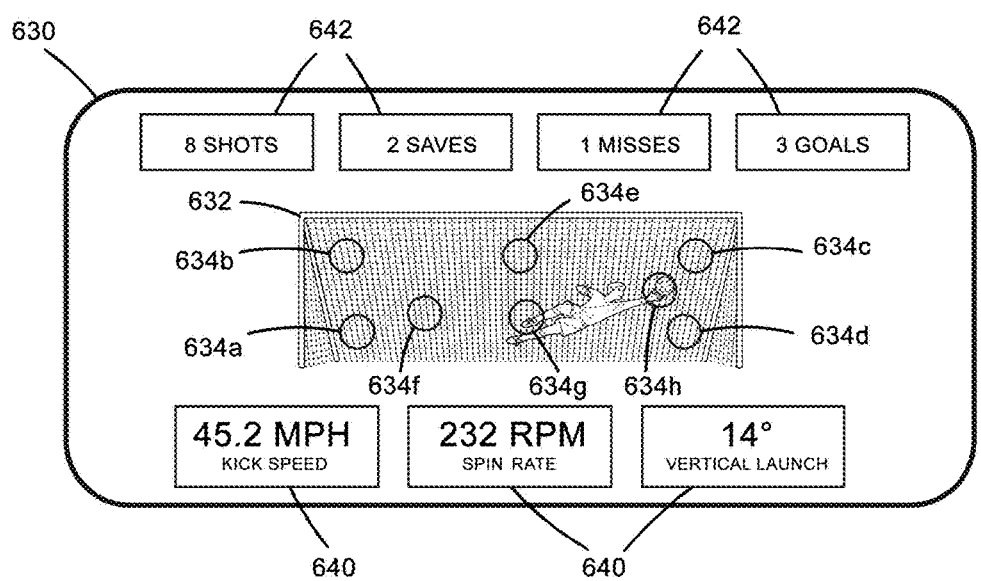
FIG. 6D is a conceptual view of a field of view of a soccer net illustrating multiple target zones, in accordance with one or more embodiments of the present disclosure.

In another embodiment, the virtual environment may include one or more suggested target locations at which the user should aim a kick. FIG. 6D is a conceptual view of a field of view 630 of a soccer net 632 illustrating multiple target zones 634, in accordance with one or more embodiments of the present disclosure. For example, the target zones 634a-d may represent, but are not required to represent, desired locations at which a kicked ball may have a relatively high predicted success rate. Further, one or more of the target zones 634 (e.g., target zones 634e-h) may represent, but are not required to represent, locations at which a kicked ball may have a relatively low predicted success rate. In another embodiment, the suggested target zones (e.g., target zones 634a-h, or the like) may be provided to the user as goals. In this regard, the user may be guided to kick the ball 116 at one or more of the target zones 634 in a selected order (e.g., in an "around the clock" game, or the like).

The user may select the virtual reality environment through any type of user interface. For example, the near-eye display 102 may provide a series of menus and display choices to the user 114. Further, the user 114 may interact with the near-eye display 102 with the user interface 228. In one embodiment, as described previously herein, the near-eye display 102 may include an eye-tracking system. In the regard, the user may scroll through various configuration menus using eye movements and may make selections using eye gestures such as, but not limited to, one or more short blinks, one or more long blinks, or eye rolls. In another embodiment, the near-eye display 102 may include one or more buttons or sliders to facilitate user input. For instance, a user may select a location within the virtual environment (e.g., a location on a virtual field) by simply sliding a finger along a slider device.

In another embodiment, the method 500 includes a step 508 of receiving tracking data of the ball 116 over a launch window after a kick. For example, the controller 108 may receive tracking data of the ball 116 from the ball-tracking sub-system 104.

In another embodiment, the method 500 includes a step 510 of displaying a virtual object representing the ball (e.g., a virtual ball 636) moving along a predicted trajectory predicted trajectory 638 within the mixed-reality environment. For example, FIG. 6A illustrates a field goal kick with a virtual ball 636 moving along a predicted trajectory 638 through the goal posts 612 for a predicted successful field goal attempt. The predicted trajectory 638 may be displayed in any user-selectable manner. For example, the entire predicted trajectory 638 may be displayed as illustrated in FIG. 6A. By way of another example, a portion of the predicted trajectory 638 may be displayed as a "tail" of a selected length behind the virtual ball 636.

The predicted trajectory may be calculated by any technique known in the art. For example, the predicted trajectory may be calculated by the controller 108 based on data from the ball-tracking sub-system 104 and/or the user-tracking sub-system 106 generated during the launch window as described previously herein. For instance, the controller 108 may determine a partial trajectory of the ball 116 over the launch window and utilize this partial trajectory along with the additional ball data at the end of the launch window such as, but not limited to velocity and rotation to determine the predicted trajectory.

In another embodiment, the controller 108 determines the predicted trajectory based on weather conditions such as, but not limited to, wind speed, air pressure, or temperature. For example, weather conditions may correspond to real-world weather conditions at the current location of the user 114. In one instance, weather conditions may be gathered by one or more weather sensors integrated within the mixed-reality kick simulator 100 (e.g., within the near-eye display 102, the ball-tracking sub-system 104, the user-tracking sub-system 106, or as stand-alone sensors). In another instance, weather conditions are received from a remote server (e.g., a weather website, or the like). By way of another example, weather conditions may be selected by the user 114 to provide for simulation and/or training in a selected environment. Similarly, the weather conditions may be manually selected (e.g., via the user interface 228) or may be received from a remote server providing weather data for a selected remote location (e.g., a field at which an upcoming game is to be played).

In another embodiment, the method 500 includes a step 512 of displaying user-selected kick analysis display objects. As described previously herein, the mixed-reality kick simulator 100 may monitor and track a wide range of metrics associated with kicking and present associated kicking analysis data to the user for feedback. For example, as illustrated in FIGS. 6A and 6D, the near-eye display 102 may display kick analysis data 640 as virtual objects to the user. By way of another example, the near-eye display 102 may display historical data 642 associated with previous user kicks such as, but not limited to, a number of successful kick attempts (e.g., of a given type, from a given location, or the like) or statistical analyses of the kick analysis data 640 (e.g., average values, best values, worst values, or the like).

In one instance the near-eye display 102 may display the kick analysis data 640 as head-locked data that remains in a fixed position regardless of the orientation of the user 114. In another instance, the near-eye display 102 may display the kick analysis data 640 as spatially anchored data at a fixed location within the virtual environment. For instance, though not shown, kick analysis data may be presented on a virtual board located on or near the field such that the data may be visible when the user looks in the direction of the virtual board.

Further, as described previously herein, the near-eye display 102 may display the kick analysis data 640 only at selected times (e.g., after a kick) or selected orientations (e.g., for view vectors above a selected angle, or the like).

In another embodiment, the mixed-reality kick simulator 100 supports multiple user modes. For example, a user mode may include predefined settings configured to provide a selected user experience. Further, the user modes may be generated, modified, and/or saved by the user 114.

Figure 7A:
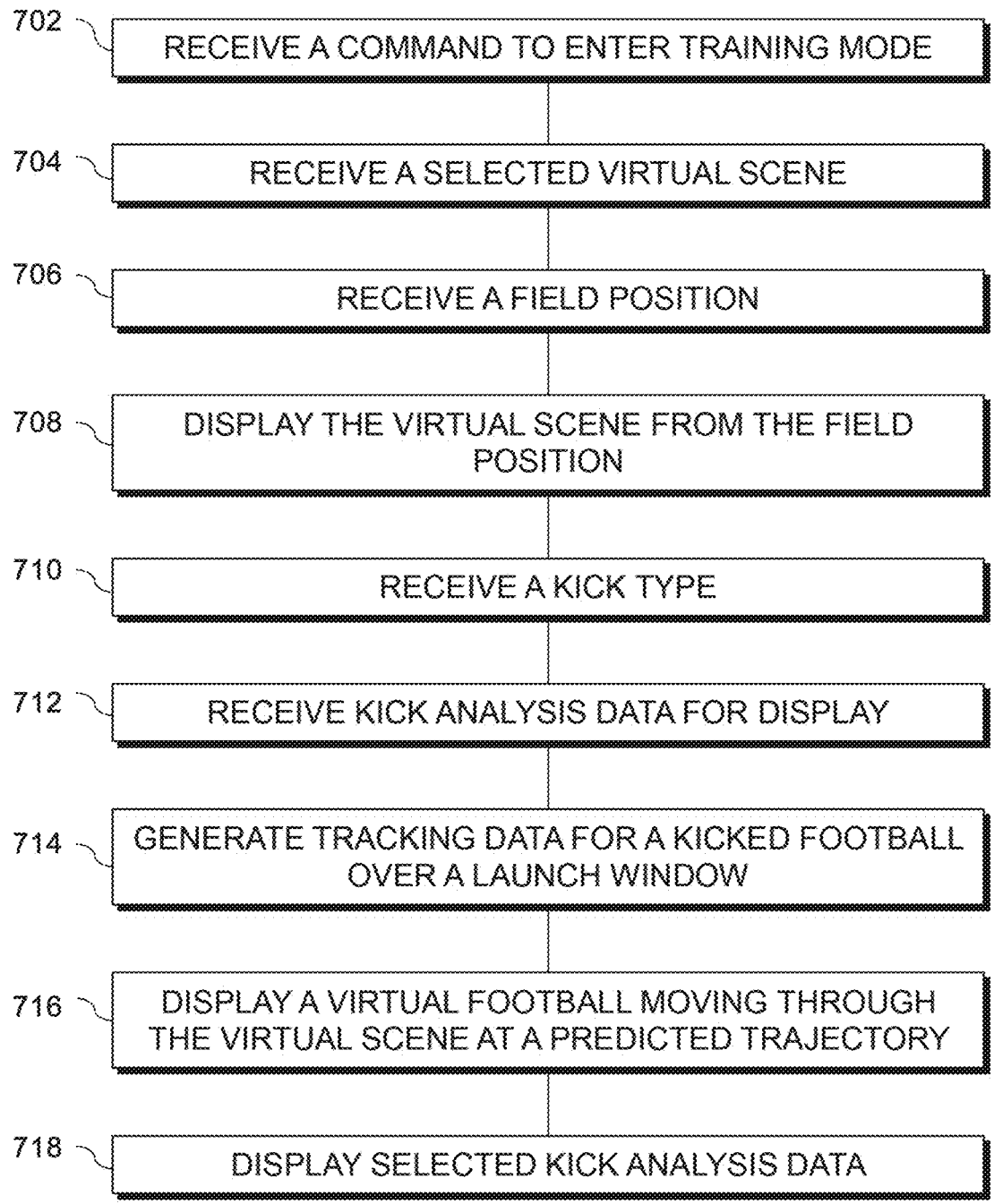
FIG. 7A is a flow diagram illustrating steps performed in a training mode, in accordance with one or more embodiments of the present disclosure.

FIG. 7A is a flow diagram illustrating steps performed in a training mode 700, in accordance with one or more embodiments of the present disclosure. Applicant notes that the embodiments and enabling technologies described previously herein in the context of the mixed-reality kick simulator 100 should be interpreted to extend to training mode 700. It is further noted, however, that the training mode 700 is not limited to the architecture of the mixed-reality kick simulator 100.

In one embodiment, a training mode provides a data-driven experience in which the user may be provided kick analysis data. In this regard, the user may utilize the kick analysis data to monitor, track, and/or analyze kicking technique. For example, the training mode may be utilized by a user on a practice field to view kick analysis data and/or coaching feedback after performing kicks. By way of another example, the training mode may be utilized by a user to include one or more mixed-reality objects (e.g., virtual objects associated with a desired field, audio feedback, or the like). In this regard, a user may train in any selected environment.

In one embodiment, the training mode 700 includes a step 702 of receiving a command to enter the training mode. For example, the user may utilize the user interface 228 of the near-eye display 102 to enter the training mode. In another embodiment, the training mode 700 includes a step 704 of receiving a selected virtual scene. For example, the training mode include a pre-configured default virtual environment that may be further adjusted based on user preferences. In one instance, the virtual environment includes a combination of physical and virtual objects associated with field markings (e.g., side lines 720, yard lines 722, end zones 724, or the like) and goal posts 726. In another instance, the virtual environment includes environment conditions such as, but not limited to, the time of day and the weather (temperature, pressure, wind speed, precipitation or the like). The environmental conditions may be automatically imported based on current conditions as monitored by sensors as described previously herein or may be adjusted by the user to provide a desired simulation environment. In another instance, the training mode 700 may provide a selected level of crowd noise via the near-eye display 102. In another embodiment, the training mode 700 includes a step 706 of receiving a selected field position. In another embodiment, the training mode 700 includes a step 708 of displaying the virtual scene from the selected field position.

In another embodiment, the training mode 700 includes a step 710 of receiving a kick type. For example, a user may select kick types such as, but not limited to, a kickoff, a punt, an on-side kick, or a field goal. By way of another example, the mixed-reality kick simulator 100 may identify a kick type after a kick. The mixed-reality kick simulator 100 may identify a kick type based on any combination of factors such as, but not limited to, a selected virtual environment, a field position, ball-tracking data, user-tracking data, or a predicted trajectory.

In another embodiment, the training mode 700 includes a step 712 of receiving selected kick analysis data for display. For example, the training mode may provide a default set of relevant kick analysis data for each kick type that may be further customizable by the user as well as general data relevant to all kick types. For instance, the training mode may provide kick analysis data such as, but not limited to, launch velocity, launch angle, arc height, rotation, hook data, or distance for all kick types. Further, the training mode 700 may provide data such as, but not limited to, hang time or landing location for kickoff kicks and punts, and may provide data such as, but not limited to whether a field goal was made based on the predicted trajectory and the location on the field.

In another embodiment, the training mode 700 includes a step 714 of generating tracking data for a kicked ball over a launch window. In another embodiment, the training mode 700 includes a step 716 of displaying a virtual ball moving through the virtual scene along a predicted trajectory. In another embodiment, the training mode 700 includes a step 718 of displaying the selected kick analysis data 728 based on the tracking data over the launch window.

Figure 7B:
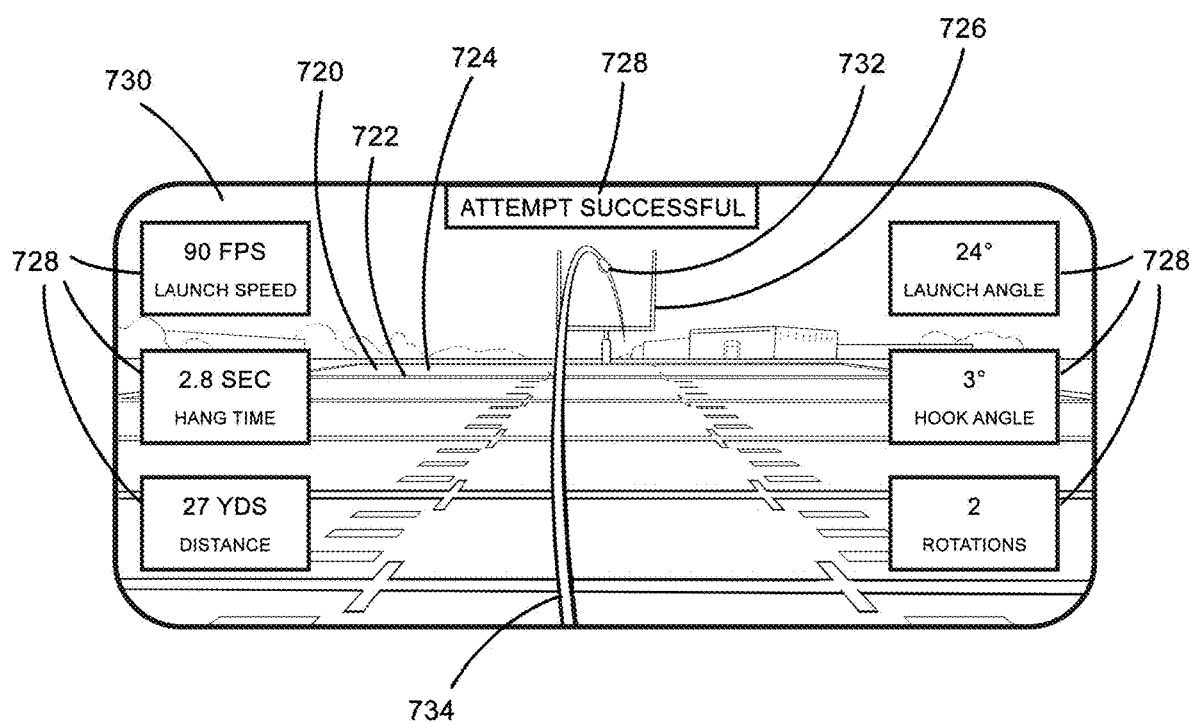
FIG. 7B includes a conceptual view of a mixed-reality scene in a training mode for a field goal indicating a virtual ball moving along a predicted trajectory and selected kick analysis data, in accordance with one or more embodiments of the present disclosure.

FIG. 7B includes a conceptual view of a mixed-reality scene 730 in a training mode 700 for a field goal indicating a virtual ball 732 moving along a predicted trajectory 734 and selected kick analysis data 728, in accordance with one or more embodiments of the present disclosure. For example, the kick analysis data 728 may include, but is not limited to, a launch velocity (e.g., launch speed), a hook angle, a hang time, a total distance, or a number of rotations. By way of another example, the kick analysis data 728 may include an indicator of whether a selected kick objective is predicted to be successful. It is recognized herein that a user may have one or more kick objectives associated with a particular kick. For instance, as illustrated in FIG. 7A, the kick analysis data 728 may include an indication of whether a field goal attempt was successful. In another instance, though not shown, kick objectives may include, but are not limited to, whether a kick exhibited a desired hang time, landing position, hook angle, number of rotations, or a goal attempt was successful.

In another embodiment, the training mode 700 may display virtual objects providing user guided coaching. For example, the near-eye display 102 may provide audio and/or visual coaching suggestions to a user on various kicking techniques, suggest foot positions, or the like. For instance, the coaching suggestions may include an opaque virtual object including images and/or video illustrating suggested techniques. In another instance, the coaching suggestions may include semi-transparent guides for suggested user movements during a kick such as, but not limited to, foot positions leading up to a kick, a suggested point of impact on the ball 116, or foot trajectories during a kick. As described previously herein, the coaching suggestions may be pre-recorded and/or may be data driven based on data from the ball-tracking sub-system 104 and/or the user-tracking sub-system 106.

Figure 8A:
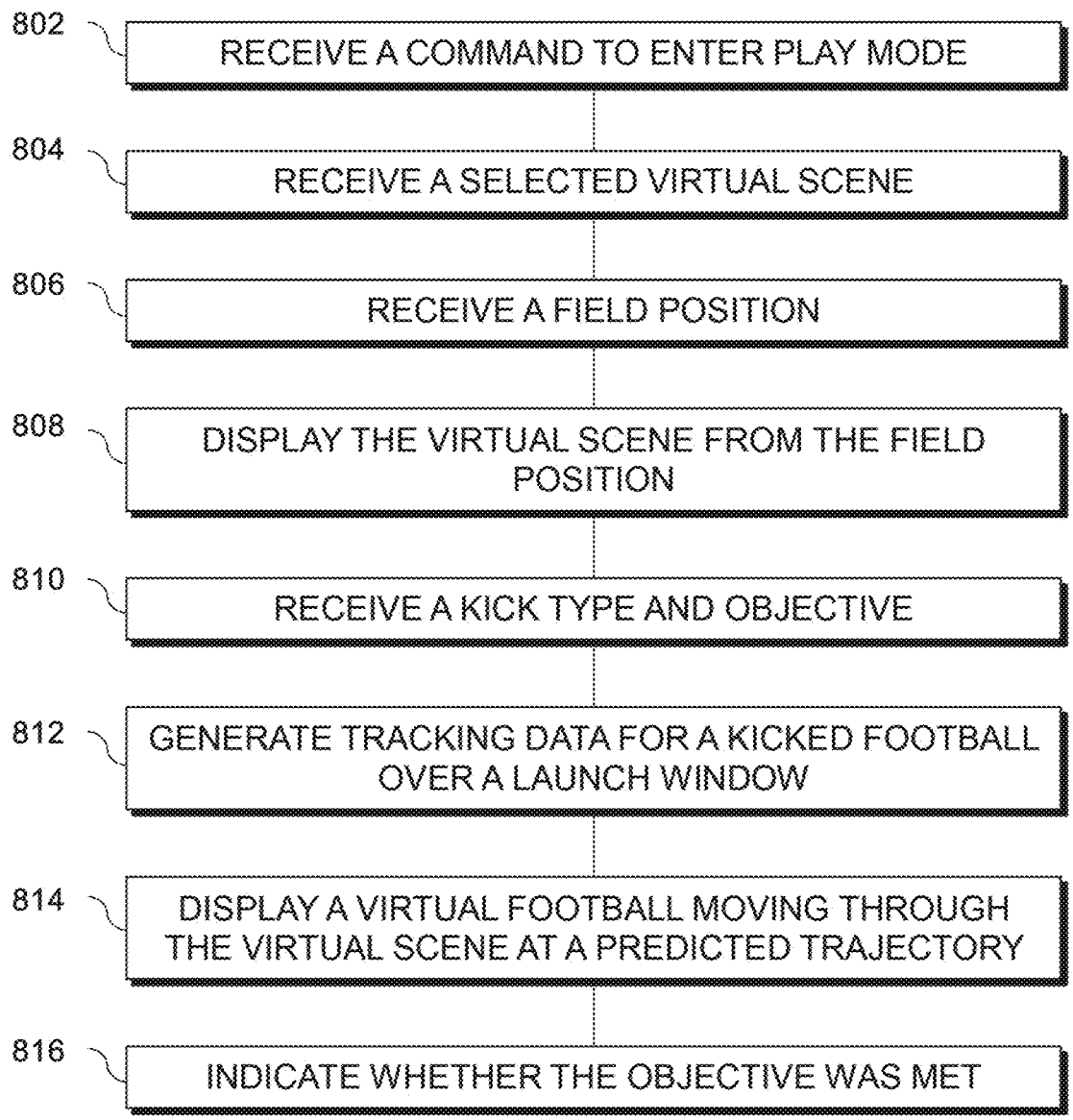
FIG. 8A is a flow diagram illustrating steps performed in a play mode, in accordance with one or more embodiments of the present disclosure.

FIG. 8A is a flow diagram illustrating steps performed in a play mode 800, in accordance with one or more embodiments of the present disclosure. Applicant notes that the embodiments and enabling technologies described previously herein in the context of the mixed-reality kick simulator 100 should be interpreted to extend to play mode 800. It is further noted, however, that the play mode 800 is not limited to the architecture of the mixed-reality kick simulator 100.

In one embodiment, a play mode may provide a user with a simulated play experience. For example, the play mode may include, but is not required to include, kicking objectives such as, but not limited to, making a field goal from a selected field position, achieving a kickoff with a selected hang time, or executing a punt to a targeted area of the field to provide a desired field position. Accordingly, in a play mode, a user may emphasize, but is not required to emphasize, the outcome of a kick over kick analysis data. For example, a user 114 may utilize a play mode to train for an upcoming game at a selected field by generating a mixed reality environment including, but not limited to, visual depictions of the stadium as well as simulated crowd noise. In this regard, the user 114 may practice (on any practice field) multiple types of kicks at multiple locations within the simulated virtual environment. Accordingly, the user 114 may feel mentally and physically prepared on the game day.

Further, a play mode may be suitable for multiplayer use in which different users may compete on the same tasks. For example, as illustrated in FIG. 4, the near-eye display 102 may display one or more avatars 402 to the user 114 within the virtual scene such that the user 114 may visualize the actions of the avatars 402 as well as interact with the avatars 402. The avatars 402 may be associated with any combination of system-generated players and additional users of the mixed-reality kick simulator 100 or a communicatively-coupled mixed-reality kick simulator 100.

In one embodiment, the play mode 800 includes a step 802 of receiving a command to enter the training mode. For example, the user may utilize the user interface 228 of the near-eye display 102 to enter the play mode 800. In another embodiment, the play mode 800 includes a step 804 of receiving a selected virtual scene. For example, the play mode 800 may provide a selection of available virtual scenes representing fields or stadiums in which to play. In one instance, the virtual environment includes a combination of physical and virtual objects associated with field markings (e.g., side lines 820, yard lines 822, end zones 824, or the like) and goal posts 826. In another instance, the virtual environment includes environment conditions such as, but not limited to, the time of day and the weather (temperature, pressure, wind speed, precipitation or the like). The environmental conditions may be automatically imported based on current conditions as monitored by sensors (e.g., within the near-eye display 102 and/or the ball-tracking sub-system 104) or may be adjusted by the user to provide a desired simulation. In another instance, the play mode 800 may provide a selected level of crowd noise via the near-eye display 102. In another embodiment, the play mode 800 includes a step 806 of receiving a selected field position. The selected field position may be provided by the user via the user interface 228. In another embodiment, the play mode 800 includes a step 808 of displaying the virtual scene from the selected field position.

In another embodiment, the play mode 800 includes a step 810 of receiving a kick type and objective. For example, a user may select kick types such as, but not limited to, a kickoff, a punt, an on-side kick, or a field goal as well as one or more desired objectives (e.g., outcomes or characteristics) associated with the kick. By way of another example, the mixed-reality kick simulator 100 may detect the kick type and/or the objective. For instance, the mixed-reality kick simulator 100 may identify a kick type and/or objective based on any combination of factors such as, but not limited to, a selected virtual environment, a field position, ball-tracking data, user-tracking data, or a predicted trajectory.

In another embodiment, the play mode 800 includes a step 812 of generating tracking data for a kicked ball over a launch window. In another embodiment, the play mode 800 includes a step 814 of displaying the selected kick analysis data based on the tracking data over the launch window.

Figure 8B:
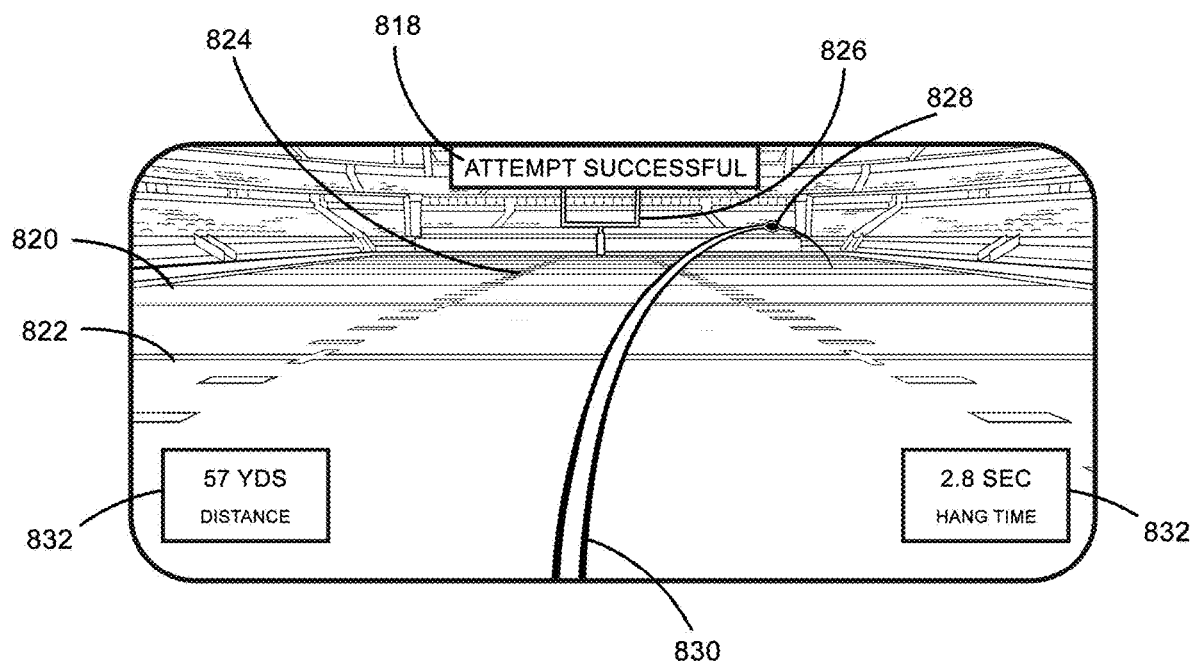
FIG. 8B includes a conceptual view of a mixed-reality field of view in a play mode indicating a simulated kickoff of a virtual ball moving along a predicted trajectory, a goal indicator, and selected kick analysis data, in accordance with one or more embodiments of the present disclosure.

FIG. 8B includes a conceptual view of a mixed-reality field of view in a play mode 800 indicating a simulated kickoff of a virtual ball 828 moving along a predicted trajectory 830, a goal indicator 818, and selected kick analysis data 832, in accordance with one or more embodiments of the present disclosure. The selected kick analysis data 830 may be, but is not required to be, selected to provide general information regarding the kick relevant to the desired objective. For example, FIG. 8B may illustrate a simulated kickoff with a kick objectives associated with a selected distance and field position (e.g., landing spot on the field). Accordingly, as illustrated in FIG. 8B, the goal indicator 818 may indicate that the kick objective is met when the predicted trajectory of the virtual ball 828 is within a selected range of distances around the target distance and/or when the predicted trajectory of the virtual ball 828 is within a selected range of field positions around the target field position.

In another embodiment, the play mode 800 includes a step 816 of indicating whether the objective was met. For example, the near-eye display 102 may include a virtual indicator 818 to indicate to the user whether the selected kick objective was met.

In one embodiment, the near-eye display 102 displays only an indication of whether the objective was met (e.g., a desired hang time and/or field position illustrated in FIG. 8B). In another embodiment, the near-eye display 102 displays additional kick analysis data relevant to the desired objective such as, but not limited to, the kick distance or the hang time of the kick to provide an indication of how close the attempt was.

It is noted herein that the above descriptions of the training mode 700 and the play mode 800, along with the associated FIGS. 7A through 8B, are provided solely for illustrative purposes and should not be interpreted as limiting. For example, the mixed-reality kick simulator 100 may support any number of user-defined or system-defined modes in which any aspect of a virtual environment may be tuned to provided a selected mixed reality experience.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected" or "coupled" to each other to achieve the desired functionality, and any two components capable of being so associated can also be viewed as being "couplable" to each other to achieve the desired functionality. Specific examples of couplable include but are not limited to physically interactable and/or physically interacting components and/or wirelessly interactable and/or wirelessly interacting components and/or logically interactable and/or logically interacting components.

It is believed that the present disclosure and many of its attendant advantages will be understood by the foregoing description, and it will be apparent that various changes may be made in the form, construction, and arrangement of the components without departing from the disclosed subject matter or without sacrificing all of its material advantages. The form described is merely explanatory, and it is the intention of the following claims to encompass and include such changes. Furthermore, it is to be understood that the invention is defined by the appended claims.

What is claimed:

1. A mixed-reality kick simulation system comprising:
   a ball-tracking sub-system configured to generate ball-tracking data when the ball is kicked by a user;
   a near-eye display configured to display mixed-reality virtual objects displayed over physical objects within a user field of view, wherein the near-eye display includes a user input device, wherein the near-eye display includes one or more sensors to determine the field of view of the user, wherein the field of view defines view vectors representing lines of sight of the user; and
   a controller communicatively coupled to the ball-tracking sub-system and the near-eye display, the controller including one or more processors configured to execute program instructions causing the one or more processors to:
      direct the near-eye display to display a mixed-reality environment including virtual objects within at least a portion of the user field of view, wherein the near-eye display provides an unobstructed real-world view for view vectors below a selected pitch angle and display at least a portion of the mixed-reality environment for view vectors above a selected pitch angle;
      receive ball tracking data of a ball kicked by the user in real-time from the ball-tracking sub-system; and
      direct the near-eye display to display a virtual object representing a trajectory of the ball within the mixed-reality environment in real-time, wherein the trajectory of the ball is based on the ball-tracking data.

2. The mixed-reality kick simulation system of claim 1, wherein the near-eye display is integrated within a helmet.

3. The mixed-reality kick simulation system of claim 1, wherein the ball-tracking sub-system comprises:
one or more sensors integrated within the ball, wherein the one or more sensors transmit the ball-tracking data to the controller via wireless communication.

4. The mixed-reality kick simulation system of claim 1, wherein the mixed-reality environment includes virtual objects comprising:
at least one of a view of a field or a stadium from a vantage point of the user at a selected location within the virtual reality scene.

5. The mixed-reality kick simulation system of claim 1, wherein the one or more processors are further configured to execute program instructions causing the one or more processors to:
direct the near-eye display to display one or more virtual objects representing at least one of an initial velocity, a kick angle, a rotation rate, a rotation direction, a predicted ground distance travelled, a predicted hang time, a predicted arc height, or a predicted hook angle based on the ball-tracking data.

6. The mixed-reality kick simulation system of claim 1, wherein the mixed-reality environment and the associated virtual objects are selectable as preset modes, wherein the preset modes include a training mode, wherein the training mode includes preset configurations of the mixed-reality environment, wherein the one or more processors are further configured to execute program instructions causing the one or more processors to:
receive a command to enter the training mode via the user input device; and
receive a kick type, wherein the training mode includes preset configurations of the virtual objects of the mix-reality environment based on the kick type.

7. The mixed-reality kick simulation system of claim 1, wherein the mixed-reality environment and the associated virtual objects are selectable as preset modes, wherein the preset modes include a play mode, wherein the play mode includes a set of user-selectable mixed reality environments, wherein the one or more processors are further configured to execute program instructions causing the one or more processors to:
receive a command to enter the play mode via the user input device; and
receive a kick type;
determine a kick objective based on the kick type;
direct the near-eye display to display a virtual object including an indicator of whether the kick objective was met based on at least one of the data from the ball-tracking sub-system or the predicted trajectory.

8. The mixed-reality kick simulation system of claim 7, wherein the kick type includes a field goal, wherein the mixed-reality environment includes virtual field goal posts located at a selected distance from the user, wherein the virtual indicator includes a prediction of whether a field goal is made based on the predicted trajectory.

9. The mixed-reality kick simulation system of claim 7, wherein the preset modes include a punt play mode, wherein the virtual indicator includes a prediction of a landing position of a punt.

10. The mixed-reality kick simulation system of claim 7, wherein the preset modes include a kickoff play mode, wherein the virtual indicator includes a prediction of a hang time of the kickoff.

11. The mixed-reality kick simulation system of claim 1, wherein the virtual reality scene comprises:
an avatar associated with a remote user.

12. The mixed-reality kick simulation system of claim 1, wherein the one or more processors are further configured to execute program instructions causing the one or more processors to:
direct the near-eye display to provide coaching feedback to the user based on the predicted trajectory.

13. The mixed-reality kick simulation system of claim 1, further comprising:
a user-tracking sub-system including one or more sensors to generate user-motion data indicative of motion of the user during a kick.

14. The mixed-reality kick simulation system of claim 13, wherein the one or more processors are further configured to execute program instructions causing the one or more processors to:
direct the near-eye display to display a virtual object including an avatar representing the user after a kick, wherein the avatar replicates motion of the user during the kick based on the user-motion data.

15. A mixed-reality kick simulation system comprising:
a ball-tracking sub-system configured to generate ball-tracking data of a ball over a launch window when the ball is kicked by a user, wherein a trajectory of the ball is limited by a ball-containment device;
a near-eye display configured to display a mixed-reality scene including virtual objects displayed over physical objects within a field of view of the user; and
a controller communicatively coupled to the ball-tracking sub-system and the near-eye display, the controller including one or more processors configured to execute program instructions causing the one or more processors to:
direct the near-eye display to provide an unobstructed view real-world view of the ball prior to a kick;
receive ball-tracking data of a ball over the launch window in real-time from the ball-tracking sub-system as the user kicks the ball; and
direct the near-eye display to display at least a portion of the ball-tracking data during the launch window as one or more virtual objects in real time after the kick.

16. The mixed-reality kick simulation system of claim 15, wherein the near-eye display includes one or more sensors to determine the field of view of the user, wherein the field of view defines view vectors representing lines of sight of the user wherein the near-eye display is configured to provide an unobstructed real-world view for view vectors below a selected pitch angle and display at least a portion of the mixed-reality environment for view vectors above a selected pitch angle.

17. A mixed-reality kick simulation system comprising:
a ball-tracking sub-system configured to generate ball-tracking data of a ball over a launch window when the ball is kicked by a user, wherein a trajectory of the ball is limited by a ball-containment device;
a near-eye display configured to display mixed-reality virtual objects displayed over physical objects within a user field of view, wherein the near-eye display includes a user input device; and
a controller communicatively coupled to the ball-tracking sub-system and the near-eye display, the controller including one or more processors configured to execute program instructions causing the one or more processors to:

direct the near-eye display to display a mixed-reality environment including virtual objects depicting one or more elements of an athletic field within at least a portion of the user field of view, wherein a location of the user within the mixed-reality environment is selectable via the user input device;

receive ball tracking data of a ball over the launch window in real-time from the ball-tracking sub-system as the user kicks the ball; and direct the near-eye display to display a virtual object representing the ball moving along a predicted trajectory after the launch window within the mixed-reality environment, wherein the predicted trajectory is determined based on the ball-tracking data over the launch window.

18. The mixed-reality kick simulation system of claim 17, wherein the near-eye display includes one or more sensors to determine the field of view of the user, wherein the field of view defines view vectors representing lines of sight of the user wherein the near-eye display is configured to provide an unobstructed real-world view for view vectors below a selected pitch angle and display at least a portion of the mixed-reality environment for view vectors above a selected pitch angle.

19. The mixed-reality kick simulation system of claim 17, wherein the near-eye display is configured to display an unobstructed real-world view when the near-eye display determines that a gaze direction of the user is directed at the ball prior to a kick, wherein the near-eye display is further configured to transition to a display of the mixed reality environment when the near-eye determines that a gaze direction of the user is directed above a selected angle.

20. The mixed-reality kick simulation system of claim 17, wherein the one or more processors are further configured to execute program instructions configured to cause the one or more processors to:

receive a kick objective; and direct the near-eye display to display a virtual object including an indicator whether the kick objective was met based on at least one of the data from the ball-tracking sub-system or the predicted trajectory.

* * * * *